United States Patent [19]

Nakayama et al.

[11] Patent Number: 5,732,385
[45] Date of Patent: Mar. 24, 1998

[54] VEHICLE NAVIGATION SYSTEM DISPLAYING BIRD-EYE VIEW OF DIFFERENT VISUAL POINTS AND DIFFERENT CONTRACTION SCALE RATIOS DEPENDING UPON VEHICLE TRAVEL CONDITIONS

[75] Inventors: Okihiko Nakayama, Yokohama, Japan; Kiyomichi Yamada, BXL, Belgium

[73] Assignee: Nissan Motor Co., Ltd., Kanagawa-ken, Japan

[21] Appl. No.: 420,992

[22] Filed: Apr. 11, 1995

[30] Foreign Application Priority Data

Apr. 15, 1994 [JP] Japan ................. 6-077359
Jul. 27, 1994 [JP] Japan ................. 6-175319

[51] Int. Cl.⁶ ............................ G06F 165/00
[52] U.S. Cl. ............................ 701/201; 340/995
[58] Field of Search ................ 364/449, 444, 364/450, 443, 444.1, 449.7; 340/995, 990

[56] References Cited

U.S. PATENT DOCUMENTS

| | | | |
|---|---|---|---|
| 5,084,822 | 1/1992 | Hayami | 364/449 |
| 5,121,326 | 6/1992 | Moroto et al. | 364/449 |
| 5,161,886 | 11/1992 | De Jong et al. | 364/449 |
| 5,371,497 | 12/1994 | Nimura et al. | 340/995 |

FOREIGN PATENT DOCUMENTS

| | | |
|---|---|---|
| 2 734 707 | 2/1990 | France . |
| 62-86499 | 4/1987 | Japan . |
| 2-61690 | 3/1990 | Japan . |
| 2-130412 | 5/1990 | Japan . |
| 3225391 | 10/1991 | Japan . |
| 4219783 | 8/1992 | Japan . |

*Primary Examiner*—Michael Zanelli
*Attorney, Agent, or Firm*—Lowe, Price, LeBlanc & Becker

[57] ABSTRACT

A vehicle navigation system includes: a key board (9) for setting a start point and a destination of a vehicle; a speed sensor (2) for detecting vehicle travel speed; an azimuth sensor (1) for detecting travel direction; a road map data memory (3) for storing road map data related to various roads; a display unit (8); and CPU (4) provided with functions for detecting a current vehicle position (CVP) on the basis of the detected speed and direction after the start point and in accordance with road map data; calculating a recommendable route from the start point to the destination on the basis of the road map data; and forming various birds-eye view road maps. In particular, the birds-eye view road maps of different visual points (E) and different contraction scale ratios can be formed according to vehicle travel speed or according to a distance from the current vehicle position to the nearest specific traffic point (e.g., intersection); that is, various birds-eye view road maps obtained from a suitable visual point and in a suitable contraction scale ratio can be displayed at all times according to the vehicle travel conditions.

13 Claims, 21 Drawing Sheets

VEHICLE NAVIGATION SYSTEM DISPLAYING BIRD-EYE VIEW OF DIFFERENT VISUAL POINTS AND DIFFERENT CONTRACTION SCALE RATIOS DEPENDING UPON VEHICLE TRAVEL CONDITIONS

BACKGROUND OF THE INVENTION

1. Field of the Invention

The present invention relates to a vehicle navigation system or a vehicle route guiding system for displaying a road map in the vicinity of the current vehicle position to guide the vehicle along the displayed road map, and more specifically to a vehicle navigation system which can is change the contraction scale ratio of the displayed road map according to various vehicle travel conditions.

2. Description of Related Art

A vehicle navigation system for calculating a recommendable vehicle travel route from a start position to a destination and for displaying the road map in the vicinity of the current vehicle position to guide the vehicle along the recommendable route is well known. In the conventional vehicle navigation system, the displayed road map is exchanged with a new one whenever the vehicle travels by a predetermined distance, so that the current vehicle position can be always displayed on the road map. However, since the number of road maps replaced with new one per unit time increases with increasing vehicle travel speed, when the vehicle travel speed is high, the road maps are exchanged frequently, with the result that the driver cannot see well or confirm securely various road information displayed on the display unit together with the road map.

To overcome this problem, Japanese Published Unexamined (Kokai) Patent Application No. 2-130412 discloses such a vehicle navigation system that the contraction scale ratio of the road maps is kept always constant and only the road information is changed according to the vehicle travel speed, for instance in such a way that only the important road information of express highways or major national roads is displayed when the vehicle travels at high speed.

In addition, there has been proposed such a vehicle navigation system that the contraction scale ratios of the road maps can be selected with a switch. However, this method is troublesome, because the contraction scale ratio must be selected by the driver with the use of the switch.

Further, Japanese Published Unexamined Patent Application No. 2-61690 discloses a superimposed method such that two road maps of large and small contraction scale ratios are displayed simultaneously on the same display unit. In this method, the vicinity of the current vehicle position is displayed in a relatively large contraction scale ratio and positions far away from the current vehicle position is displayed in a relatively small contraction scale ratio.

In an example shown in FIG. 1, only a nearest intersection from the current vehicle position along the vehicle travel direction is enlarged and displayed on the upper right side of the rod map. In this guiding system, there exists such an advantage that the driver can see an enlarged road map near the current vehicle position and in addition he can know the road situation near the current vehicle position in detail. In this guiding system, however, since an enlarged road map is displayed on the upper right corner on the display unit, the original road map is not displayed completely, thus resulting in a problem in that when the driver will turn to the right for instance, it is impossible to confirm the road situation ahead on the right side along the vehicle travel direction.

To overcome this problem, there exists a method of displaying the road map in the form of an birds-eye view. In this birds-eye view, the road map is displayed as if seen from the sky obliquely downward, which is well known in the field of the flight simulator.

This birds-eye view will be explained in further detail with reference to FIG. 2, in which the topography (ground) lies in an XY plane, and a visual point E (x, y, z) is determined on a Z axis perpendicular to the XY plane. A rectangle abcd is a range actually displayed on the display unit, and a road map range seen from the visual point E through the rectangle abcd is a broad ground range ABCD. In other words, in the birds-eye view it is possible to see road map data lying in the rectangle ABCD much broader than the displayed rectangle abcd.

In this method, since an image can be displayed as if a broad trapezoidal range ABCD were seen from a visual point E, this method is referred to as an birds-eye (air or bird's eye) view display method. In this birds-eye view display method, there exists such an advantage that a center f of the rectangle abcd representative of the displayed range corresponds to a position F in the trapezoid ABCD and further this point F is located near the side AB rather than the side CD of the trapezoid ABCD. Accordingly, the range from the side AB to the point F can be displayed in the lower half of the display unit. Further, since the side AB is shorter than the side CD, the side AB can be displayed as an enlarged view.

FIG. 3B shows an example of the birds-eye view, in which a recommendable vehicle travel route from a start position to a destination is shown together with the vicinity thereof the current vehicle position CVP in the birds-eye view method. In this example, the visual point is set in the sky opposite to the destination (behind the current vehicle position), and the ground (topography) is seen from above in the vehicle travel direction. Further, the current vehicle travel position CVP is also shown in the birds-eye view road map as an arrow. In such a displayed image as described above, the map contraction scale ratio increases continuously with increasing distance from the current vehicle position; in other words, the vicinity of the current vehicle position can be enlarged and further the recommendable route can be displayed far to the destination.

On the other hand, FIG. 3A shows an example of the usual display, in which the current vehicle position CVP is indicated on roughly the same position on the map as that shown in FIG. 3B. In FIG. 3A, although the current vehicle position CVP and the vicinity thereof can be displayed in an enlarged scale, the recommendable route is displayed only at a short distance.

In the above-mentioned vehicle navigation system with the use of the road maps of birds-eye view, the ground range to be displayed on the display unit is largely dependent upon the location of the visual point and the visual direction (the vertical overlook angle to the ground and the horizontal visual line direction. In other words, when the visual point and the visual direction are not correct, the satisfactory display range required for the driver cannot be displayed. Accordingly, if only the visual point is set so that the current vehicle position can be displayed on the display unit, when the visual direction is not determined correctly, it is impossible to sufficiently display the ground from the current vehicle position to the destination.

On the other hand, when the vehicle travels at high speed, the driver wishes to see a point far from the current vehicle position on the road map. On the other hand, when the vehicle travels at low speed, the driver wishes to see a point near the current vehicle position on the same road map in detail. In the conventional vehicle navigation system, however, since the contraction scale ratio cannot be adjusted automatically according to the vehicle speed, the driver must select the appropriate contraction scale ratio with a switch, thus causing a troublesome operation.

On the other hand, there exists such a tendency that the driver can see and recognize well the road map near the current position, when the recommendable vehicle travel direction is shown vertically on the display unit; that is, when the current travel road is displayed in the vertical direction on the central upper side of the display unit (without displaying the current travel road on the right or left side thereof obliquely). In particular, in the case where the vehicle approaches a traffic position at which the vehicle tends to travel erroneously away from the recommendable route (e.g., intersections of a plurality of roads), it is preferable that the travel direction toward the intersections is displayed in the vertical direction on the display unit, as shown in FIG. 4B, rather than displayed as shown in FIG. 4A.

On the other hand, when there exists no intersections at which the vehicle tends to travel erroneously away from the recommendable route in the vicinity of the current vehicle position, it is preferable that the recommendable route can be displayed to as far a distance away from the current vehicle position as possible.

SUMMARY OF THE INVENTION

With these problems in mind, therefore, it is the object of the present invention to provide a vehicle navigation system which can control the visual point and the contraction scale ratio of the displayed road maps of birds-eye view according to the vehicle travel speed.

Further, the other object of the present invention is to provide a vehicle navigation system which can display the road map of birds-eye view in such a way the visual point and/or the visual direction for birds-eye view can be adjusted according to the distance between the current vehicle position and the nearest intersection to be guided, so that the driver can well see the road map and thereby can be well guided in accordance with the road map.

To achieve the above-mentioned object, the present invention provides a vehicle navigation system, comprising: vehicle position setting means (9) for setting a start point and a destination of a vehicle; vehicle speed sensing means (2) for detecting vehicle travel speed; vehicle travel azimuth detecting means (1) for detecting vehicle travel direction; road map data storing means (3) for storing road map data related to various roads; vehicle position detecting means (4A) for detecting a current vehicle position (CVP) on the basis of the detected vehicle speed and travel direction after the start point and in accordance with road map data; recommendable route calculating means (4B) for calculating a recommendable route from the start point to the destination on the basis of the road map data; birds-eye view forming means (4E) for forming various birds-eye view road maps of different visual points (E) and different contraction scale ratios according to vehicle travel conditions; and display means (8) for displaying the formed birds-eye view road map.

Further, the first aspect of the present invention provides a vehicle navigation system, comprising: vehicle position setting means (9) for setting a start point and a destination of a vehicle; vehicle speed sensing means (2) for detecting vehicle travel speed; vehicle travel azimuth detecting means (1) for detecting vehicle travel direction; road map data storing means (3) for storing road map data related to various roads; vehicle position detecting means (4A) for detecting a current vehicle position (CVP) on the basis of the detected vehicle speed and travel direction after the start point and in accordance with road map data; recommendable route calculating means (4B) for calculating a recommendable route from the start point to the destination on the basis of the road map data; birds-eye view forming means (4E) for forming an birds-eye view road map taken from a visual point (E) located in the sky behind the current vehicle position; the visual point (E) being determined on the basis of a visual line end position (F), a visual line length (|EF|), a vertical overlook angle ($\theta$), and a horizontal visual line direction angle ($\phi$) according to the detected travel speed; and display means (8) for displaying the formed birds-eye view road map.

Further, the birds-eye view forming means sets the visual line end position (F) near the current vehicle position so that the detected current vehicle position (CVP) can be displayed substantially at the same position on the display means, irrespective of the vehicle travel speed.

Further, the birds-eye view forming means sets the visual point (E) to a higher point (E2) far behind away from the current vehicle position (CVP) when vehicle travel speed is high, but to a lower point (E1) near behind away from the current vehicle position when the vehicle travel speed is low, while keeping the vertical overlook angle ($\theta$) at a constant value, irrespective of the vehicle travel speed.

Further, the birds-eye view forming means sets the visual point (E) to a lower point (E3) far behind away from the current vehicle position (CVP) when vehicle travel speed is high, but to a higher point (E4) near behind away form the current vehicle position when the vehicle travel speed is low, while keeping the visual line length (|EF|) between the visual point (E) and the current vehicle position (CVP) at a constant value, irrespective of the vehicle travel speed.

Further, the visual point (E) of the taken birds-eye view are changed continuously or stepwise according to vehicle travel speed.

Further, the birds-eye view forming means sets the horizontal visual line direction ($\phi$) to a vehicle travel direction detected by said azimuth detecting means. The birds-eye view forming means sets the horizontal visual line direction ($\phi$) to a direction in which the calculated recommendable route can be display over the longest distance on the display means. The birds-eye view forming means sets the horizontal visual line direction ($\phi$) to a direction of the destination.

Further, the second aspect of the present invention provides a vehicle navigation system, comprising: vehicle position setting means (9) for setting a start point and a destination of a vehicle; vehicle speed sensing means (2) for detecting vehicle travel speed; vehicle travel azimuth detecting means (1) for detecting vehicle travel direction; road map data storing means (3) for storing road map data related to various roads; vehicle position detecting means (4A) for detecting a current vehicle position (CVP) on the basis of the detected vehicle speed and travel direction after the start point and in accordance with road map data; recommendable route calculating means (4B) for calculating a recommendable route from the start point to the destination on the basis of the road map data; specific point extracting means (4C) for extracting specific traffic points for the vehicle to be guided from the calculated recommendable route; distance comparing means (4D) for comparing a distance (d) between the current vehicle position and one of the extracted specific traffic points with a predetermined value (D); birds-eye view forming means (4E) for forming an birds-eye view road map taken from a visual point (E) located in the sky behind the current vehicle position; the visual point (E) being determined on the basis of a visual line end position (F), a visual line length (|EF|), a vertical overlook angle (θ), and a horizontal visual line direction angle (φ) according to a distance (d) between the current vehicle position and one of the extracted specific traffic points; and display means (8) for displaying the formed birds-eye view road map.

Here, one of the extracted specific traffic points is a nearest guide intersection crossing the recommendable route.

Further, the birds-eye view forming means sets the visual line end position (F) to the nearest guide intersection, to display the nearest guide intersection substantially vertically on the display means, when the compared distance (d) to the nearest guide intersection is shorter than the predetermined value (D); but to a point a predetermined distance ahead from the current vehicle position along the recommendable route, to display the recommendable route substantially vertically on the display means, when the compared distance (d) to the nearest guide intersection is longer than the predetermined value (D).

Further, the birds-eye view forming means sets the visual line end position (F) to a point in the vehicle travel direction, to display the vehicle travel direction substantially vertically on the display means, when the compared distance (d) to the nearest guide intersection is shorter than the predetermined value (D); but to a point a predetermined distance ahead from the current vehicle position along the recommendable route, to display the recommendable route substantially vertically on the display means, when the compared distance (d) to the nearest guide intersection is longer than the predetermined value (D).

Further, the birds-eye view forming means sets the vertical overlook angle (θ) at which the recommendable route can be displayed over the longest distance, by calculating several displayed recommendable routes within the vertical overlook limit angle (α) determined according to the detected distance between the current vehicle position to the nearest guide intersection.

Further, the birds-eye view forming means sets the visual point (E) to a lower point (E1) near behind away from the current vehicle position (CVP) when the compared distance (d) to the nearest guide intersection is shorter than the predetermined value (D); but to a higher point (E2) far behind away form the current vehicle position when the compared distance to the nearest guide intersection is longer than the predetermined value, while keeping the vertical overlook angle (θ) at a constant value irrespective of the distance between the two; said birds-eye view forming means further setting the visual line end position (F) to a line between the current vehicle position and the nearest guide intersection to display the nearest guide intersection substantially vertically on the display means, irrespective of the distance between the two.

Further, the birds-eye view forming means sets the visual point (E) to a higher point (E4) near behind away from the current vehicle position (CVP) when the compared distance (d) to the nearest guide intersection is shorter than the predetermined value (D), but to a lower point (E3) far behind away form the current vehicle position when the compared distance to the nearest guide intersection is longer than the predetermined value, while keeping a distance (EF) between the visual point (E) and the current vehicle position (CVP) at a constant value irrespective of the distance between the two; said birds-eye view forming means further setting the visual line end position (F) to a line between the current vehicle position and the nearest guide intersection or an extension line thereof to display the nearest guide intersection substantially vertically on the display means, irrespective of the distance between the two.

Further, the first aspect of the present invention provides a method of guiding an automotive vehicle, comprising the steps of: setting a start point and a destination of a vehicle; detecting vehicle travel speed; detecting vehicle travel direction; storing road map data related to various roads; detecting a current vehicle position (CVP) on the basis of the detected vehicle speed and travel direction after the start point in accordance with road map data; calculating a recommendable route from the start point to the destination on the basis of the road map data; forming an birds-eye view road map taken from a visual point (E) located in the sky behind the current vehicle position, by changing the visual point (E) determined on the basis of a visual line end position (F), a visual line length (|EF|), a vertical overlook angle (θ), and a horizontal visual line direction angle (φ), according to the detected travel speed; calculating a road range to be displayed; reading road map data from the stored road map data; transforming the road map data into birds-eye view road map data; storing the transformed birds-eye view road map data; displaying the formed and stored birds-eye view road map; and updating the birds-eye view road map for each predetermined vehicle travel distance.

Further, the step of forming the birds-eye view road map comprises the steps of: setting the visual line end position (F) at the current vehicle position (CVP); setting the vertical visual line direction angle (φ); calculating a visual line direction length |EF| in accordance with a formula as |EF|= k1+k2+vehicle speed, where k1 and k2 are a constant, respectively; and calculating the visual point (E) on the basis of the set visual line end position (F), the set vertical visual line direction angle (φ), and the calculated visual line direction length (|EF|), while keeping the vertical overlook angle (θ) at a constant value.

Further, the step of forming the birds-eye view road map comprises the steps of: setting the visual line end position (F) at the current vehicle position (CVP); setting the visual line direction angle (φ); calculating the vertical overlook angle θ at the current vehicle position in accordance with a formula as θ=k3+k4×vehicle speed, where k3 and k4 are a constant, respectively; and calculating the visual point (E) on the basis of the set visual line end position (F), the set vertical visual line direction angle (φ), and the calculated vertical overlook angle (θ), while keeping the visual line length (|EF|) at a constant value.

Further, the second aspect of the present invention provides a method of guiding an automotive vehicle, comprising the steps of: setting a start point and a destination of a vehicle; detecting vehicle travel speed; detecting vehicle travel direction; storing road map data related to various roads; detecting a current vehicle position (CVP) on the basis of the detected vehicle speed and travel direction after the start point in accordance with road map data; calculating a recommendable route from the start point to the destination on the basis of the road map data; detecting whether the vehicle has passed through an intersection; if has passed the intersection, reading a nearest intersection from the stored road map data; if not passed through the intersection, calculating a distance d from the current vehicle position to the nearest intersection; forming an birds-eye view road map taken from a visual point (E) located in the sky behind the current vehicle position, by changing the visual point (E) determined on the basis of a visual line end position (F), a visual line length (|EF|), a vertical overlook angle (θ), and a horizontal visual line direction angle (φ), according to the calculated distance d to the nearest intersection; calculating a road range to be displayed; reading road map data from the stored road map data; transforming the road map data into birds-eye view road map data; storing the transformed birds-eye view road map data; displaying the formed and stored birds-eye view road map; and updating the birds-eye view road map for each predetermined vehicle travel distance.

Further, the step of forming the birds-eye view road map comprises the steps of: if the calculated distance d is shorter than the predetermined distance D, setting the visual point (E) behind the current vehicle position and further setting the visual line end position (F) to the nearest intersection; and if the calculated distance d is longer than the predetermined distance D, setting a visual point (E) behind the current vehicle position and further setting the visual line end position (F) to a point a predetermined distance ahead from the current vehicle position along the recommendable route.

Further, the step of forming the birds-eye view road map comprises the steps of: if the calculated distance d is shorter than the predetermined distance D, setting the visual point (E) behind the current vehicle position and further setting the visual line end position (F) to a point along a vehicle travel direction; and if the calculated distance d is longer than the predetermined distance D, setting the visual point (E) behind the current vehicle position and further setting the visual line end position (F) to a point a predetermined distance ahead from the current vehicle position along the recommendable route.

Further, the step of forming the birds-eye view road map comprises the steps of: calculating a vertical overlook limit angle α in accordance with a formula as α=k×d/D+c where k and D denote a constant, respectively; selecting vertical overlook angles (θi) within the calculated vertical overlook limit angle (α); forming birds-eye view road maps at the selected vertical overlook angles (θi); selecting one of the vertical overlook angles (θi) at which the recommendable route can be displayed over the longest distance; forming an birds-eye view road map by changing the visual point (E) on the basis of the selected vertical overlook angle (θ).

Further, the step of forming the birds-eye view road map comprises the steps of: if the calculated distance d is shorter than the predetermined distance D, calculating a distance L between the visual point (E) and the current vehicle position (CVP) in accordance with a formula as L=j1×d+j2 where j1 and j2 denote a constant, respectively; if the calculated distance d is longer than the predetermined distance D, setting the distance L to a fixed value L0; setting the visual line end position (F) to a line between the current vehicle position and the nearest intersection; and forming an birds-eye view road map taken from a visual point (E), by changing the visual point (E) on the basis of the calculated distance L between the visual point (E) and the current vehicle position (CVP), and the set visual line end position (F), while keeping the vertical overlook angle (θ) at a constant value.

Further, the step of forming the birds-eye view road map comprises the steps of: if the calculated distance d is shorter than the predetermined distance D, calculating the vertical overlook angle θ in accordance with a formula as θ=k5−k6×d where k5 and k6 denote a constant, respectively; if the calculated distance d is longer than the predetermined distance D, setting the vertical overlook angle θ to a fixed value θ0; setting the visual line end position (F) to a line between the current vehicle position and the nearest intersection or an extension line thereof; and forming an birds-eye view road map taken from a visual point (E), by changing the visual point (E) on the basis of the calculated vertical overlook angle (θ) and the set visual line end position (F), while keeping the visual line length (|EF|) at a constant value.

As described above, in the vehicle navigation system according to the present invention, since the birds-eye view road maps of various visual points and various contraction scale ratios can be displayed appropriately according to the vehicle speed or the distance between the current vehicle position and a specific traffic point (e.g., the nearest intersection), the driver can see the road map under the best conditions at all times.

DETAILED DESCRIPTION OF THE EMBODIMENTS

Embodiments of the vehicle navigation system according to the present invention will be described hereinbelow with reference to the attached drawings.

[Basic Embodiment]

Figure 5A:
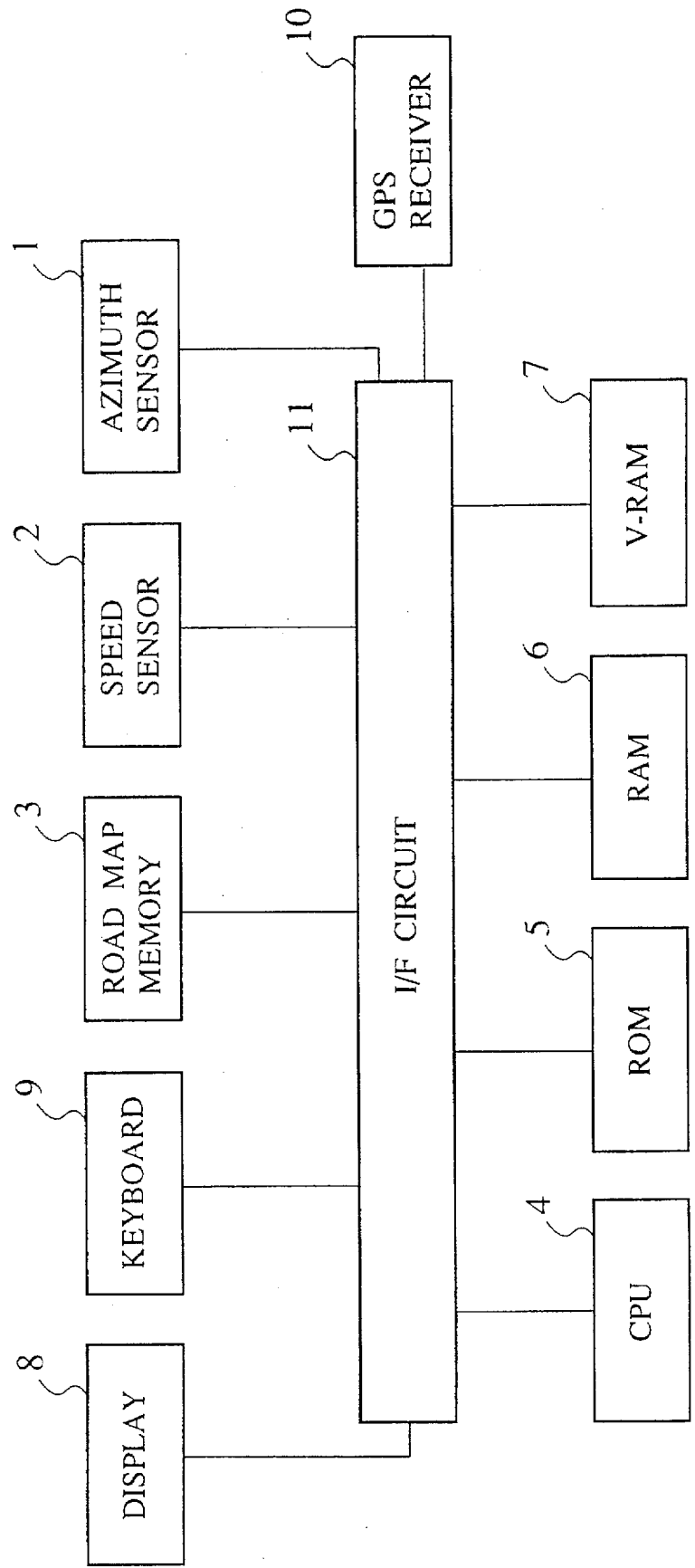
FIG. 5A is a block diagram showing a basic embodiment of the vehicle navigation system according to the present invention.
Figure 5B:
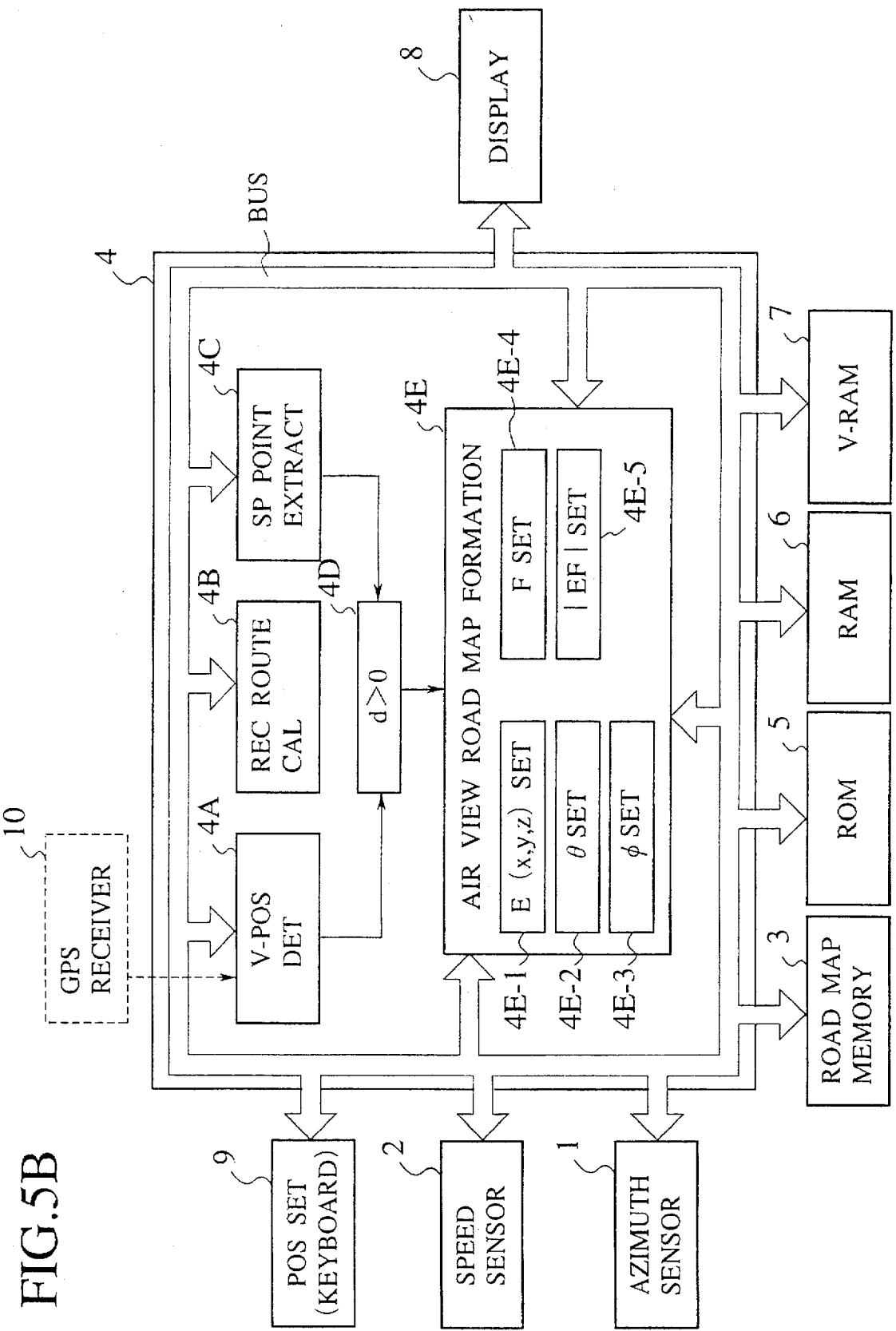
FIG. 5B is a block diagram showing another basic embodiment (in which the CPU functions are shown) of the vehicle navigation system according to the present invention.

FIG. 5A is a basic block diagram showing the vehicle navigation system according to the present invention, and FIG. 5B is a similar basic block diagram showing the functions of the CPU shown in FIG. 5A in detail. In FIG. 5A, the system comprises an azimuth sensor (vehicle travel azimuth detecting means) 1 for detecting a vehicle travel direction from the north or the south; a vehicle speed sensor (vehicle speed sensing means) 2 for detecting vehicle travel speed (e.g., mounted on a transmission to output a predetermined number of pulse signals according to vehicle speed); a road map data memory (road map data storing means) 3 for storing various road map data together with various road network data (e.g., node position information indicative of intersections or curved points, etc., or character information such as route distances of link roads between two nodes, place names, etc.); a CPU 4 for executing various processing in accordance with control programs; a ROM 5 for storing the control programs executed by the CPU 4; a RAM 6 for storing calculation results of the CPU 4; a V-RAM 7 for storing birds-eye view display data formed by the CPU 4 and display as pictographic information; a display unit (display means) 8 for displaying stored birds-eye view road map data; an operation key board (vehicle position setting means) 9 for setting various data such as a start point, a destination, etc.; a GPS (ground position satellite) receiver 10 for receiving GPS signals transmitted by a GPS satellite; and an interface (I/F) circuit 11 for transferring various signals to and from the above-mentioned elements 1 to 10.

Further, as shown in FIG. 5B, the CPU is provided with such functions as vehicle position determining means 4A; recommendable vehicle travel route calculating means 4B; a specific traffic point (e.g., a nearest intersection along the recommendable route) extracting means 4C; distance comparing means 4D for comparing a distance between the current vehicle position and the nearest intersection with a predetermined value; and an birds-eye view road map forming means 4E. Further, the birds-eye view road map forming means 4E is further provided with visual point E(x, y, z) setting means 4E-1; vertical overlook angle ($\theta$) setting means 4E-2; horizontal visual line direction ($\phi$) setting means 4E-3; visual line end position (F) setting means 4E-4; visual line length (|EF|) calculating means 4E-5; etc.

Figure 9:
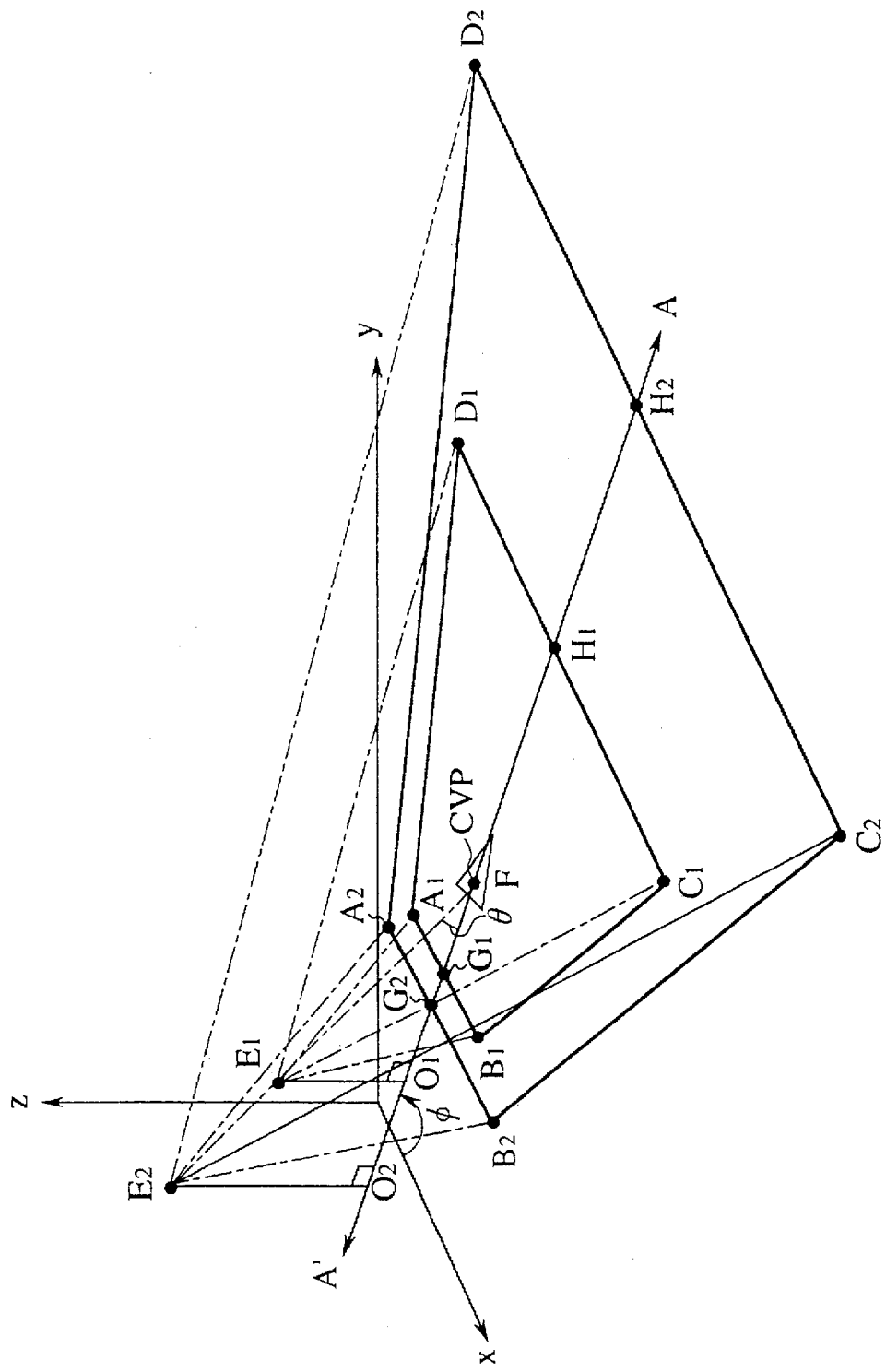
FIG. 9 is a view for assistance in explaining the movement of the visual point and the visual line direction of the birds-eye view road map of the first embodiment.

Here, with reference to FIG. 9, when an birds-eye view road map is required to be formed, it is necessary to decide the visual point E (x, y, z) and the visual line end position F (x, y, 0). Here, the visual line end position F is set near to a specific position on the road map (e.g., a current vehicle position CVP). Upon decision of the visual point E and the visual line end position F, a vertical overlook (visual line) angle $\theta$ from the x-y plane, a horizontal visual line direction $\phi$ from the x-axis, and the visual line length |EF| (vector) between E and F can be determined.

[First Aspect]

The first aspect of the vehicle navigation system according to the present invention will be described hereinbelow. The feature of the first aspect is to form the birds-eye view road maps of various visual points and various contraction scale ratios according to vehicle travel speed. The basic embodiment of the first aspect of the present invention will be explained hereinbelow.

Figure 6:
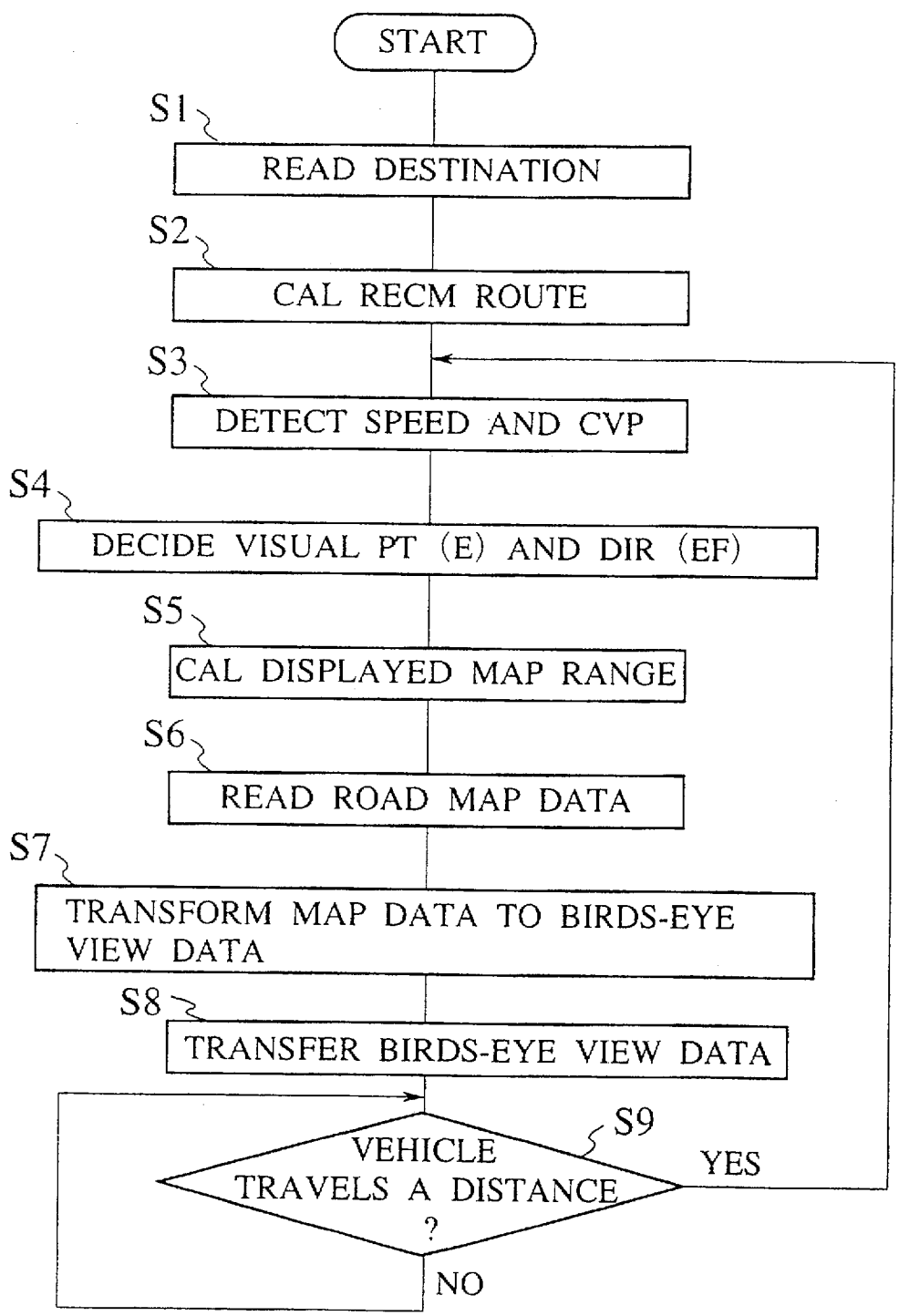
FIG. 6 is a flowchart showing a basic procedure for forming an birds-eye view in the vehicle navigation system according to the present invention.

In the vehicle navigation system, when an ignition switch is turned to any position of ACC, IGN and START, the CPU 4 starts to execute the procedure as shown by a flowchart in FIG. 6.

That is, in step S1, the CPU 4 (referred to as control, hereinafter) reads a destination inputted through the operation key board 9.

In step S2, control calculates a recommendable vehicle travel route from a start point and the destination by searching various routes in accordance with the well-known searching method (See Japanese Published Unexamined Patent Application No. 62-86499). Here, the start point can be inputted through the operation key board 9 or detected on the basis of the GPS signal received by the GPS receiver 10.

In step S3, control counts the number of speed pulses (outputted by the vehicle speed sensor 2) per unit time and detects the vehicle travel speed and further calculates the vehicle travel distance. Further, control calculates a vehicle travel locus on the basis of the calculated vehicle travel distance and the travel azimuth detected by the azimuth sensor 1, and compares with the calculated vehicle travel locus with the road map data stored in the road map memory 3 to specify the current vehicle position CVP. Further, it is also possible to calculate and specify the vehicle travel speed and the current vehicle position CVP on the basis of the GPS signals received by the GPS receiver 10.

Figure 8:
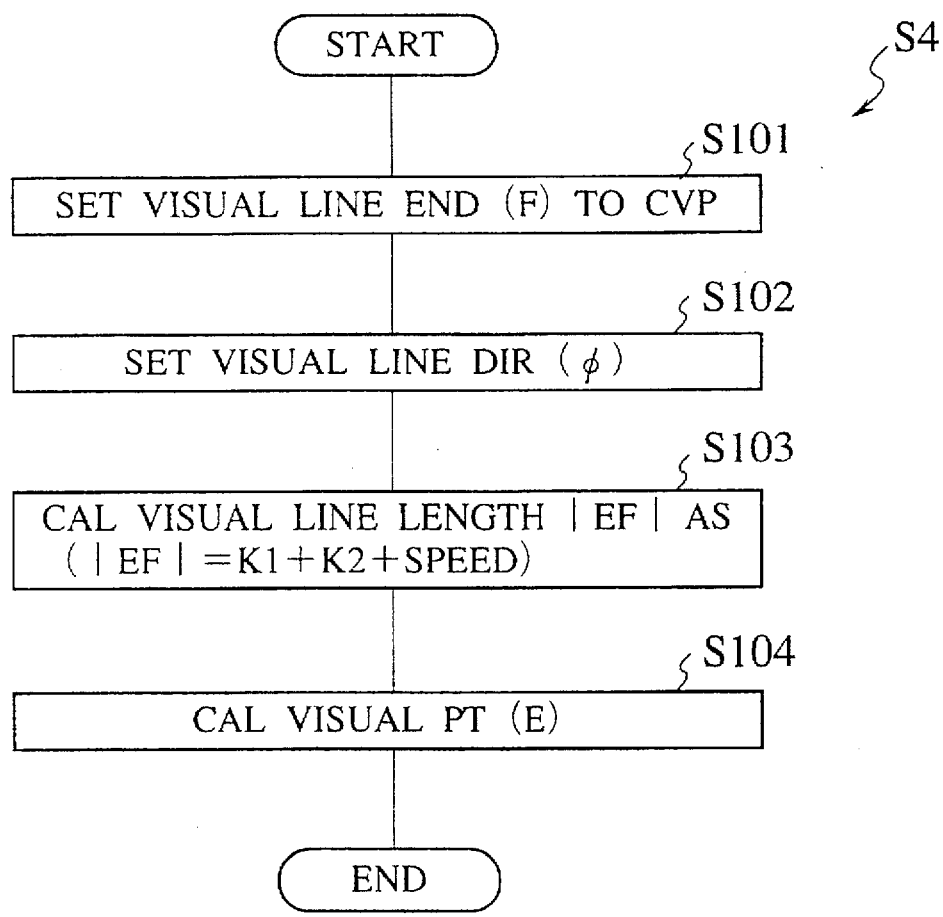
FIG. 8 is a flowchart showing a more detailed procedure of the step S4 shown in FIG. 6, for explaining a first embodiment of a first aspect of the navigation system according to the present invention.

In step S4, control decides a visual point E and a visual line direction EF both necessary to form an birds-eye view on the basis of the detected vehicle speed and the calculated current vehicle position CVP and in accordance with the procedure shown in FIG. 8.

Figure 1:
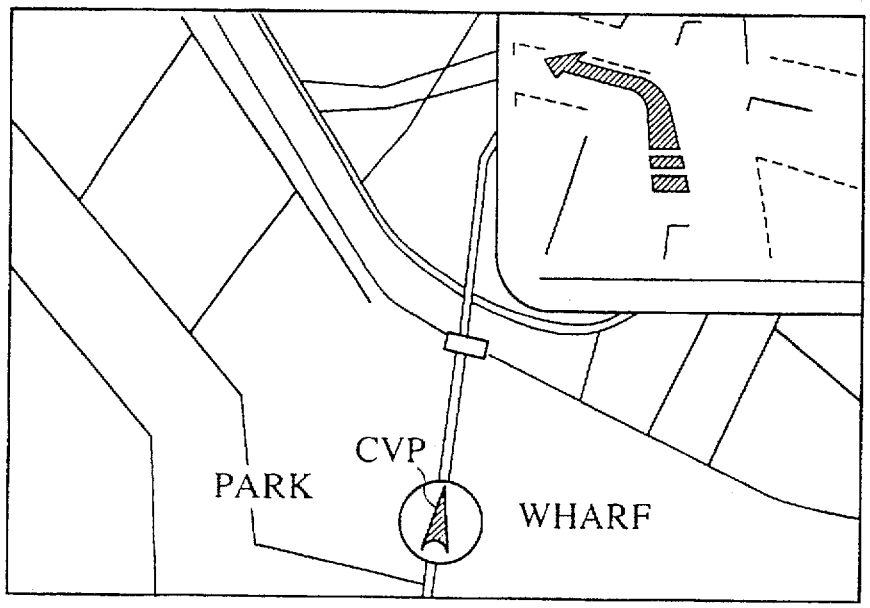
FIG. 1 is a view showing an example of usual road maps of the conventional vehicle guiding system.
Figure 2:
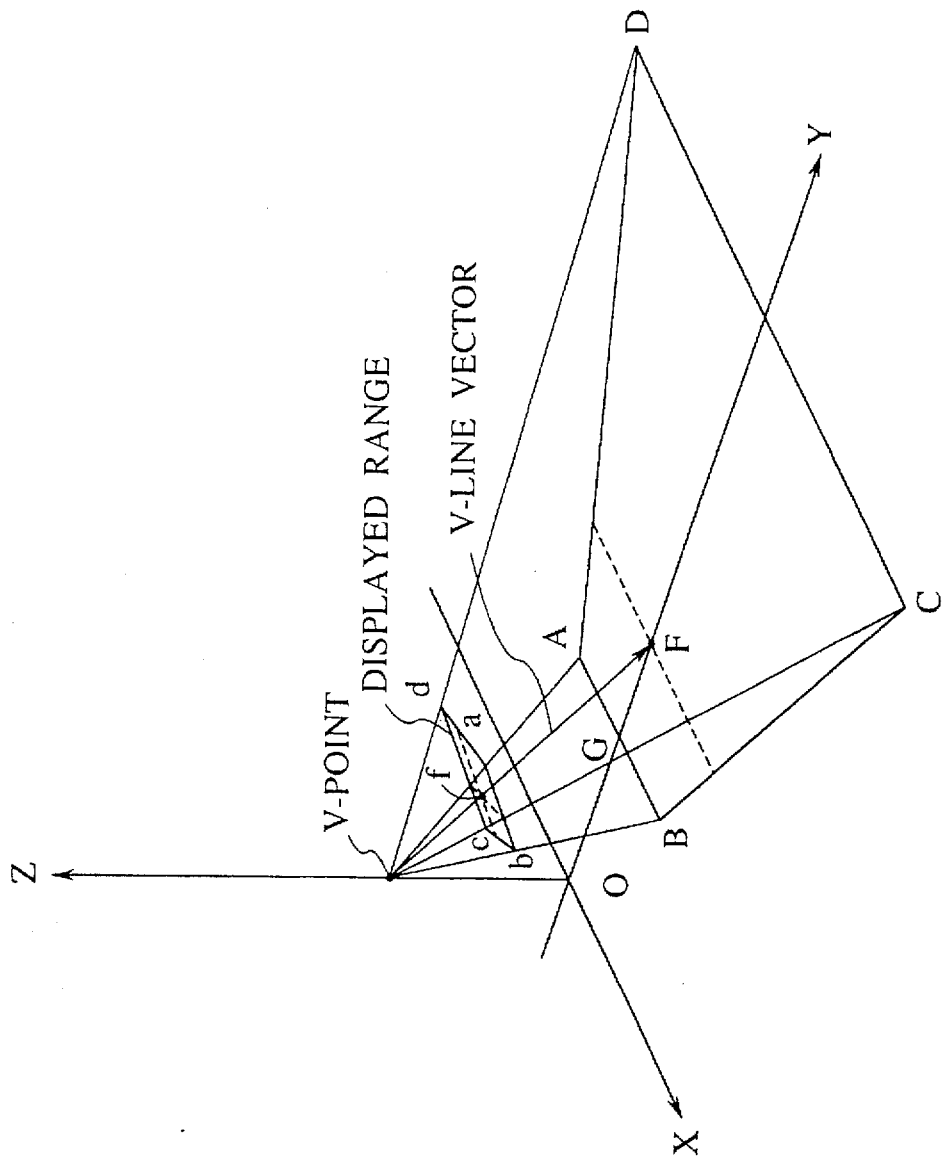
FIG. 2 is a view for assistance in explaining the birds-eye view display method.
Figure 3A:
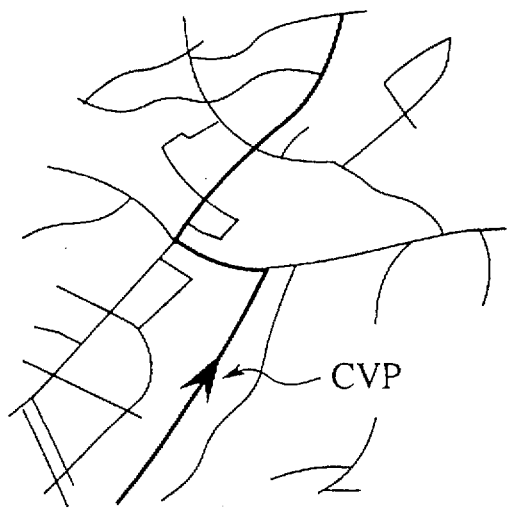
FIG. 3A is a view showing an example of usual road maps, which displays a recommendable route and the vicinity thereof.
Figure 3B:
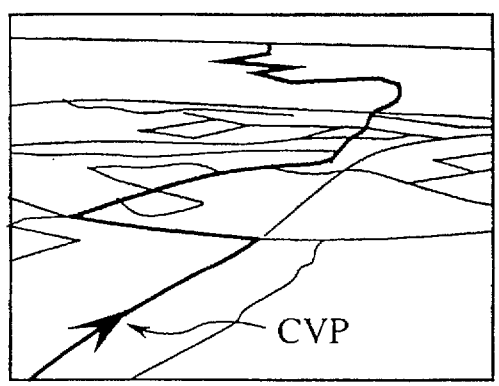
FIG. 3B is a view showing an example of birds-eye view road maps, which displays a recommendable route and the vicinity thereof.
Figure 4A:
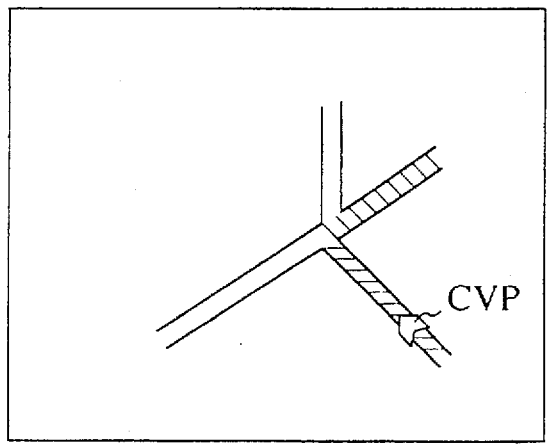
FIG. 4A is a view showing an example of an intersection displayed on the display unit.
Figure 4B:
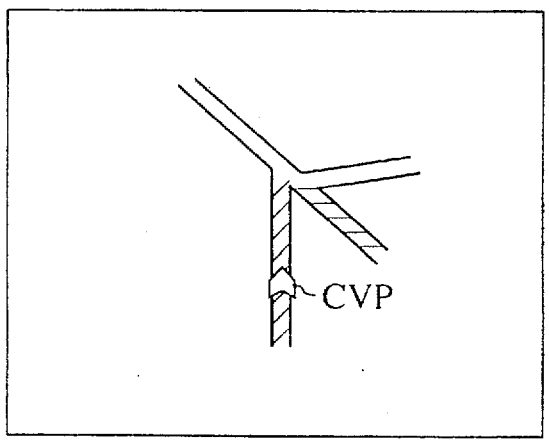
FIG. 4B is a view showing another preferable example of an intersection displayed on the display unit.

In step S5, control calculates a road map range to be displayed on the display unit 8. In more detail, control decides the range where the trapezoidal range ABCD shown in FIG. 2 is displayed as the road map on the display unit 8.

In step S6, control reads road map data corresponding to the road map range decided in step S5 from the load map memory 3.

In step S7, control transforms the road map data read from the road map memory in step S6 into birds-eye view road map data. In other words, control transforms the road map data in the trapezoidal range ABCD shown in FIG. 2 into image data to be displayed as a road map in the range abcd also shown in FIG. 2.

The above-mentioned transformation can be executed in accordance with the transformation formula as follows:

$$\begin{pmatrix} Ex \\ Ey \\ Ez \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \times \begin{pmatrix} \sin\phi & -\cos\phi & 0 & 0 \\ \cos\phi & \sin\phi & 0 & 0 \\ 0 & 0 & 1 & 0 \\ 0 & 0 & 0 & 1 \end{pmatrix} \times \begin{pmatrix} 1 & 0 & 0 & -Vx \\ 0 & 1 & 0 & -Vy \\ 0 & 0 & 1 & -Vz \\ 0 & 0 & 0 & 1 \end{pmatrix} \times \begin{pmatrix} Mx \\ My \\ Mz \\ 1 \end{pmatrix} \quad (1)$$

where (Vx, Vy, 0) denote the coordinates of the visual point E; (Mx, My, 0) denote the coordinates on the usual road map; (Sx, Sy) denote the coordinates on the birds-eye view road map; and (Ex, Ey, Ez) denote intermediate values for obtaining the coordinates (Sx, Sy).

Figure 16A:
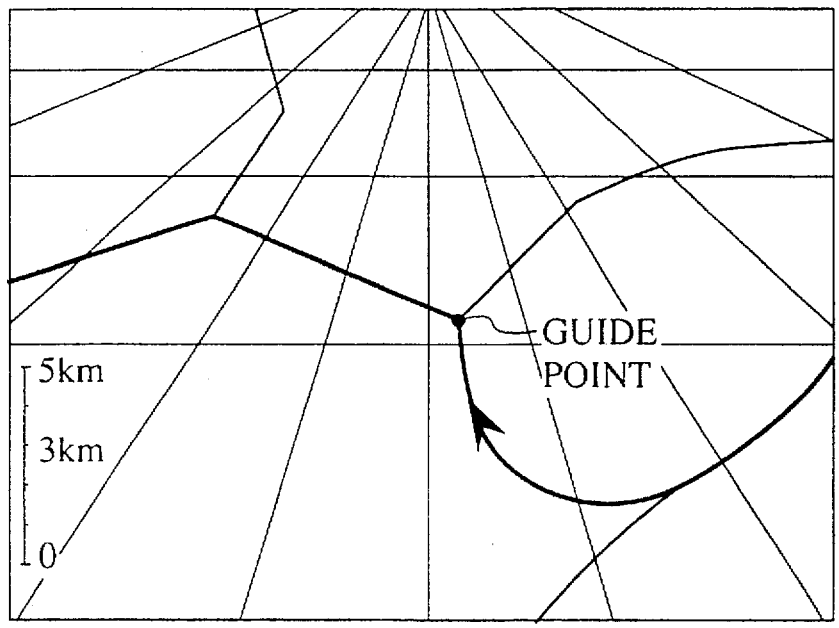
FIG. 16A is a view showing an example of birds-eye view road maps obtained when the distance to the next guide intersection is short.
Figure 16B:
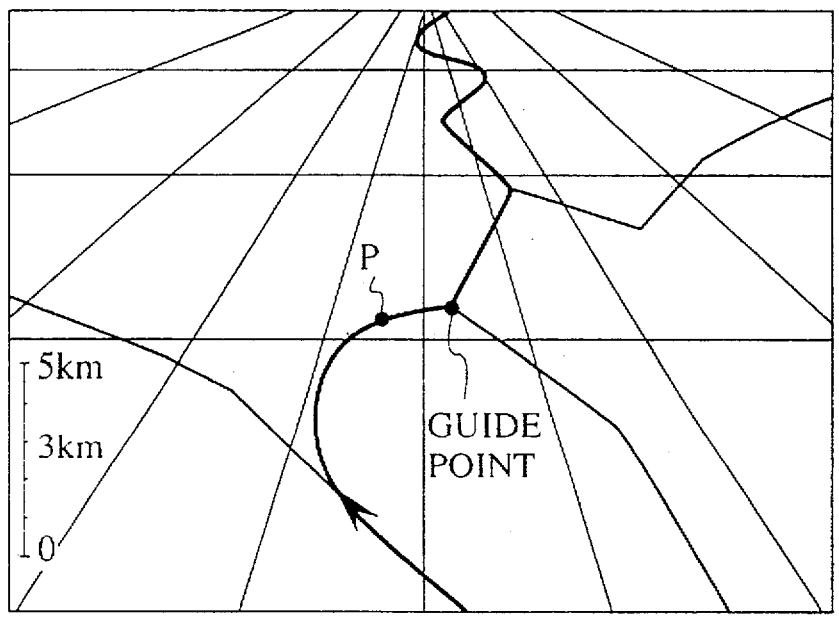
FIG. 16B is a view showing an example of birds-eye view road maps obtained when the distance to the next guide intersection is long.

Further, in step S7, after the image data have been formed, the color of the recommendable route obtained in step S2 is determined so as to be distinguishable from that of the birds-eye view road map data. Further, a vehicle mark indicative of the current vehicle position CVP (obtained in step S3) is also synthesized with the image data (e.g., in the form of an arrow as shown in FIGS. 16A and 16B).

In step S8, the image data formed in step S8 are transferred to the V-RAM 7 to display the transformed road map data of the birds-eye view on the display unit 8.

In step S9, control discriminates whether the vehicle travels by a travel distance longer than a predetermined value on the basis of the output signal of the vehicle speed sensor 2 or the GPS signal. If YES, control returns to the step S3 to calculates the visual point E and the visual line direction EF again, and displays again the birds-eye view road map data on the basis of the recalculated results. On the other hand, if NO in step S9, control remains at the same step S9.

Figure 7:
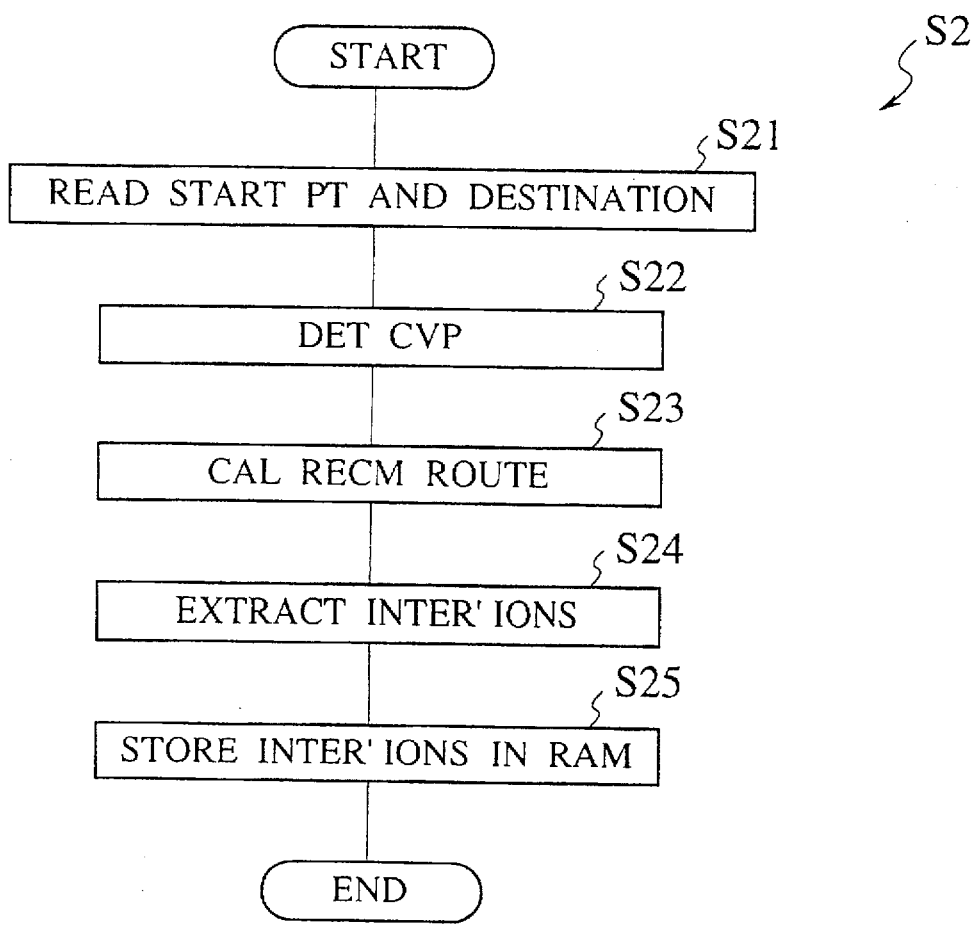
FIG. 7 is a flowchart showing a more detailed procedure of the step S2 shown in FIG. 6.

With reference to a flowchart as shown in FIG. 7, the steps of recommendable route calculation processing executed by the CPU 4 in step S2 in FIG. 6 will be described in further detail hereinbelow.

In step S21, control first reads a start point and a destination point both inputted from the operation key board 9, for instance.

Further, in step S22, control detects the current vehicle speed by counting the number of pulses per unit time or measuring the pulse period both outputted by the vehicle speed sensor 2 and further calculates the travel distance by multiplying the detected current speed by the unit time. In addition, control calculates the vehicle travel locus on the basis of the calculated vehicle travel distance and a vehicle travel azimuth detected by the azimuth sensor 1, and detects the current vehicle position CVP by comparing the obtained distance and the azimuth with the road map data stored in the road map memory 3 (map matching). The method of detecting the current position as described above is referred to as an autonomous navigation. However, it is also possible to detect the current vehicle position CVP on the basis of the GPS signal received by the GPS signal receiver 10, as already explained.

In step S23, control calculates a recommendable vehicle travel route from the start point to the destination on the road map.

In step S24, control extracts specific traffic points (e.g., specific intersections (referred to as guide intersections, hereinafter)) necessary to guide the vehicle along the recommendable route from the road map memory 3, and further stores various information related to the extracted guide intersections in the RAM 6. The reason why the guide intersections are extracted in this step is as follows: since there are many intersections (e.g., intersections with small roads) unnecessary to guide the vehicle along the recommendable route, when the road map is replaced or redisplayed with another road map so often at all the unnecessary intersections, the load of the CPU 4 increases without having no special significance. Further, the guide intersections are extracted on the basis of the classification of roads (express highways, national roads, prefecture roads, etc.) crossing the recommendable route, the angles of intersections with other roads, the number of crossing roads at the intersection, etc.

In step S25, control stores the guide intersections (specific traffic points) extracted in step S24 above in the RAM 6, ending the procedure.

(First Embodiment of First Aspect)

The first embodiment of the first aspect of the present invention will be explained. The feature of the first embodiment resides in step S4 of FIG. 6. Therefore, only the step of deciding the visual point E and the visual line direction EF executed in step S4 in FIG. 6 will be described in detail hereinbelow with reference to FIGS. 8 and 11.

FIG. 9 shows an example of the visual points E1 and E2 and the visual line length |EF| both set in accordance with the flowchart shown in FIG. 8. in which the end position F of the visual line length |EF| is set to a position near the current vehicle position CVP on the road map.

In this first embodiment, the vertical overlook angle θ between the horizontal line AA' and the visual line length |EF| is determined always constant, and the horizontal visual line direction angle φ between the horizontal line AA' (upon which the visual line EF is projected) and the x axis is also determined always constant, as shown in FIG. 9.

Figure 10A:
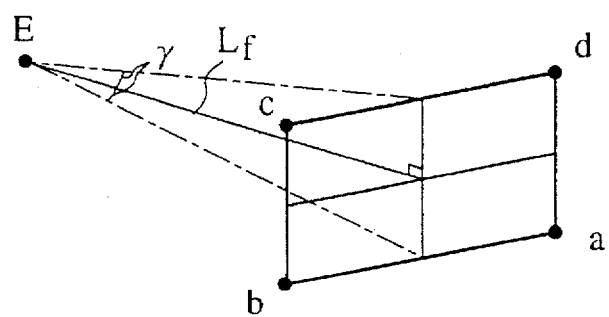
FIGS. 10A and 10B are views for assistance in explaining the relationship between the visual point and the display position (visual field angle)
Figure 10B:
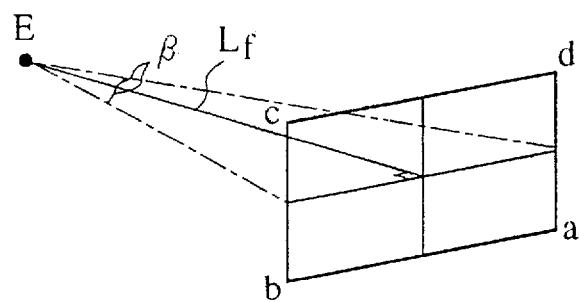
Figure 11:
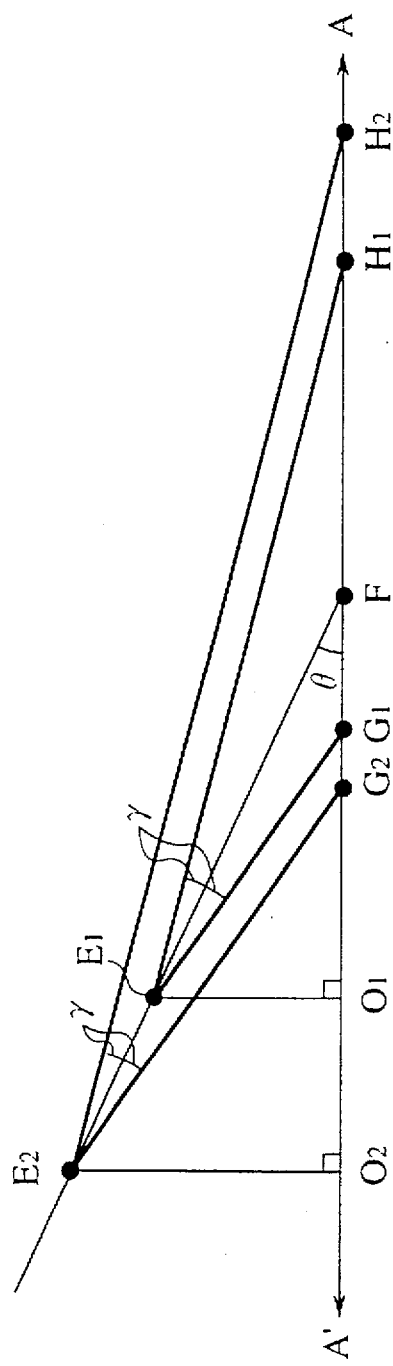
FIG. 11 is a view obtained when the view shown in FIG. 9 is seen from the side thereof.

Further, as shown in FIGS. 10A and 10B and 11, the vertical and horizontal visual field angles 2γ and 2β (within which the road map can be seen from the visual point E) are determined always constant. In other words, as shown in FIGS. 10A and 10B, since the distance Lf between the visual point E and the apparent displayed image range abcd is kept always constant and further the area of the displayed range is also constant, the vertical visual field angles 2γ and the horizontal visual field angle 2β are both kept always constant, irrespective of the visual point E as shown.

With reference FIG. 8, in step S101, control sets the end position F of the visual line length EF near the current vehicle position CVP obtained by the step S3 in FIG. 6.

Further, in step S102, control determines the horizontal visual line direction φ. Here, the horizontal visual line direction φ can be set to any of various directions (e.g., the vehicle travel direction detected by the azimuth sensor 1, a direction along which the recommendable route can be displayed over the longest distance, a direction from the current vehicle position to the destination, etc.).

In step S103, control determines the magnitude of the visual line length |EF| (vector) in accordance with the formula (2):

$$|EF|=k1 \times k2 \times \text{vehicle speed} \qquad (2)$$

where k1 and k2 denote a positive constant value, respectively.

As understood by the formula (2), the lower the vehicle speed is, the shorter will be the visual line length; or the higher the vehicle speed is, the longer will be the visual line length.

In step S104, control determines the visual point E on the basis of the visual line end position (current vehicle position) F, the visual line length |EF| dependent upon the vehicle speed, the vertical overlook angle θ between the axis AA' and the visual point E, and the horizontal visual line direction angle φ between the x axis and the axis AA'.

In the example shown in FIG. 9, the visual point E is set to E1 when the vehicle speed is low, but to E2 when high. Further, when the visual point is E1, the displayed map range is a trapezoidal range A1–B1–C1–D1; and when the visual point is E2, the displayed map range is a trapezoidal range A2–B2–C2–D2, respectively.

FIG. 11 shows a view in which the direction AA' shown in FIG. 9 is taken along the abscissa, and the z-axis shown in FIG. 9 is taken along the ordinate. As shown, when the visual point is E1, the displayed map range is a small range G1–H1; and when the visual point is E2, the displayed map range is a large range G2–H2, respectively. Therefore, when the visual point is E2, a broader road map can be displayed.

As described above, in the first embodiment, the overlook angle θ from the visual point E is kept constant, and the visual line length |EF| is changed according to the vehicle speed. That is, the higher the vehicle speed is, the longer will be the visual line length. Therefore, the higher the vehicle speed is, the broader will be the road map range; or the lower the vehicle speed is, the narrower will be the road map range, so that the more detail road map near the current vehicle position can be displayed at low vehicle speed. Accordingly, the displayed road map can satisfy the driver's request.

Further, in step S103 in FIG. 8, although the visual line length |EF| is changed continuously according to the vehicle speed, it is also possible to change the visual line length |EF| stepwise according to the vehicle speed, for instance as follows:

Here, the visual line length |EF| is decided at four stages:

(1) |EF|=EF1, if speed is lower than 20 km/h.

(2) |EF|=EF2, if speed is between 20 and 40 km/h.

(3) |EF|=EF3, if speed is between 40 and 70 km/h.

(4) |EF|=EF4, if speed is higher than 70 km/h.

Here, EF1<EF2<EF3<EF4

Further, in the first embodiment, when the vehicle speed is very high, since the road network information to be displayed on the display unit 8 increases excessively, the road map is not easy to see. In this case, it is preferable to display only the important information related to an express highway or a major road, for instance.

(Second Embodiment of First Aspect)

The second embodiment of the first aspect of the present invention will be described hereinbelow. In the first embodiment, the visual line length |EF| is determined according to the vehicle speed. In this second embodiment, the vertical overlook angle θ is changed according to the vehicle speed. The second embodiment is the same as the first embodiment except the step S4 shown in FIG. 6. Therefore, only the step S4 is described with reference to the flowchart shown in FIG. 12.

Figure 13:
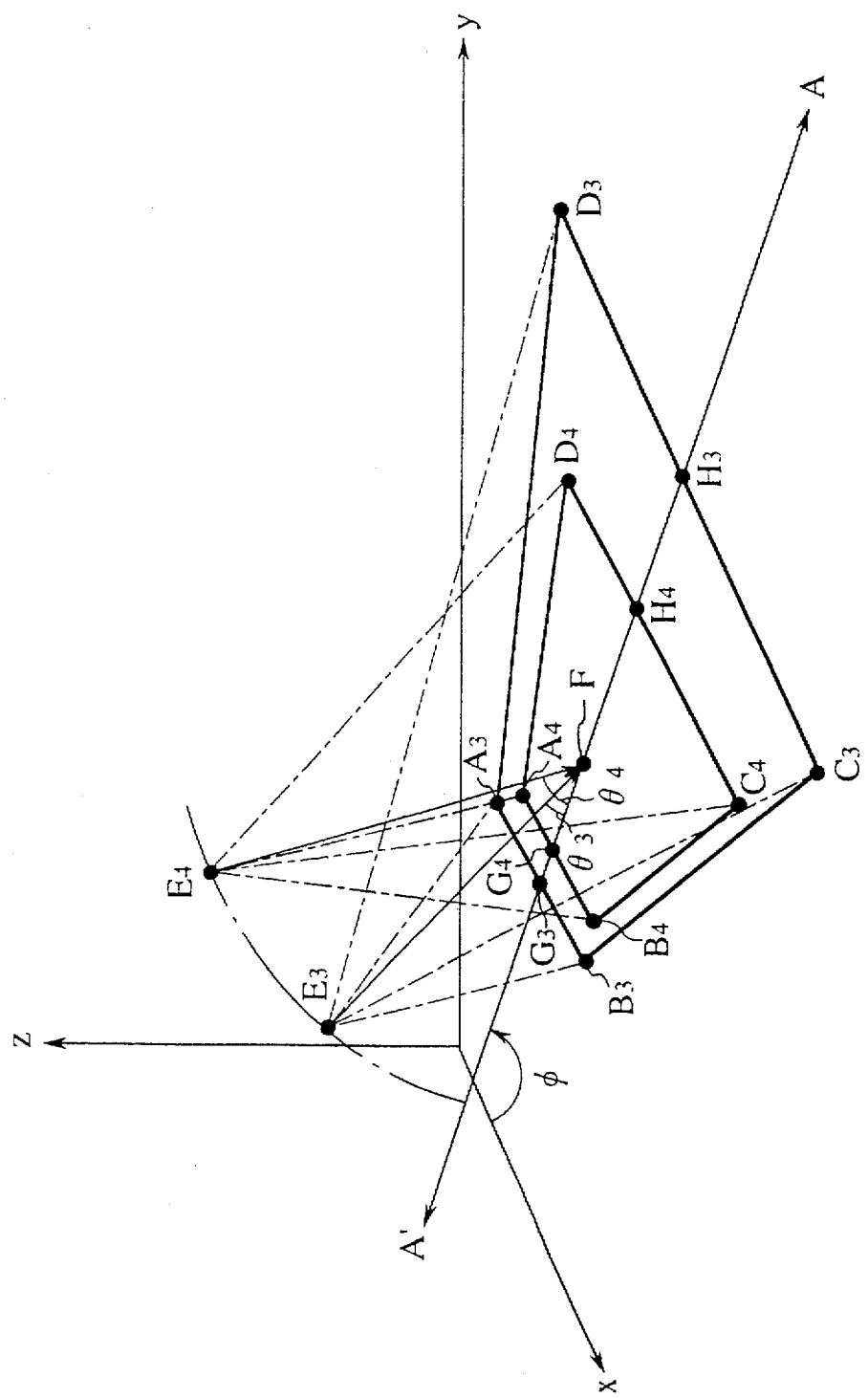
FIG. 13 is a view for assistance in explaining the movement of the visual point and the visual line direction of the birds-eye view road map of the second embodiment.

In this second embodiment, as shown in FIG. 13, the visual line length |EF| between the visual point E and the visual line end position F is kept always constant, and only the vertical overlook angle θ is changed according to the vehicle speed. Further, in this embodiment, the visual line end position F is decided near the current vehicle position CVP on the road map in the same way as with the case of the first embodiment.

Figure 12:
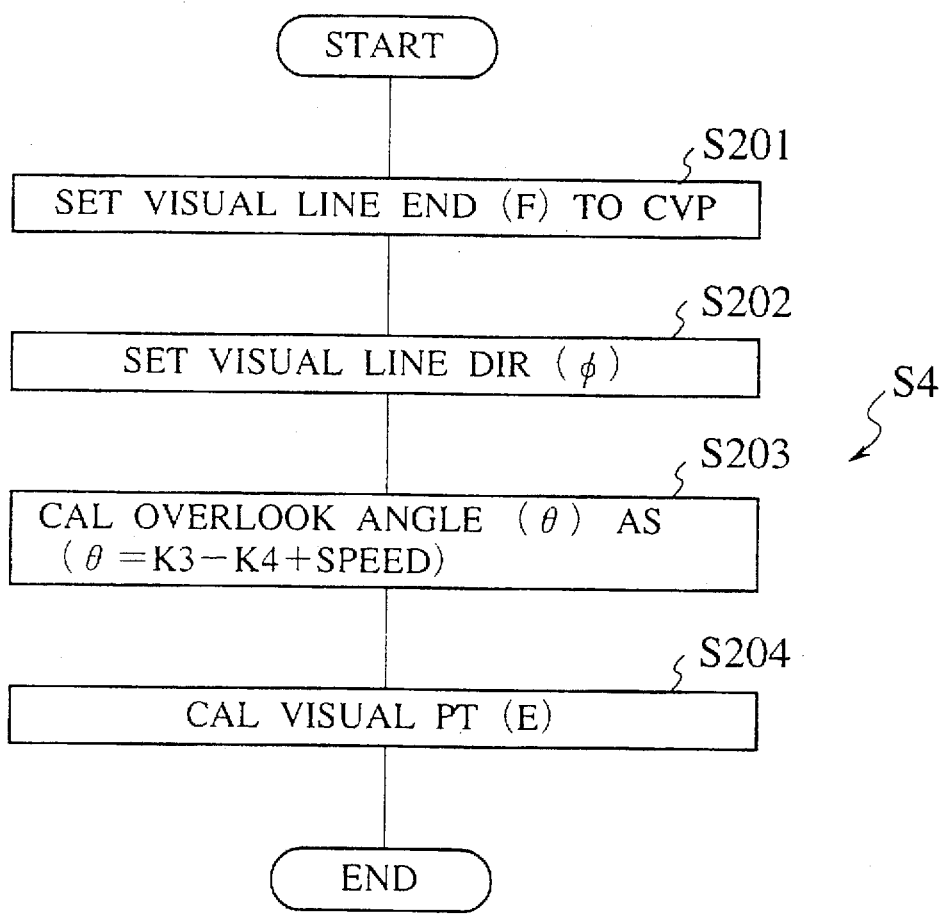
FIG. 12 is a flowchart showing a more detailed procedure of the step S4 shown in FIG. 6, for explaining a second embodiment of the first aspect of the navigation system according to the present invention.

With reference FIG. 12, in step S201, control sets the end position F of the visual line direction EF near the current vehicle position CVP obtained the step S3 in FIG. 6.

Further, in step S202, control determines the horizontal visual line direction angle φ. Here, the horizontal visual line direction angle φ can be set to any of various directions in the same way with the case of the first embodiment.

In step S203, control determines the vertical overlook angle θ between the axis AA' and the visual line direction EF in accordance with the formula (3):

$$\theta = k3 - k4 \times \text{vehicle speed} \qquad (3)$$

where k3 and k4 denote a positive constant value, respectively.

As understood by the formula (3), the lower the vehicle speed is, the larger will be the overlook angel or the higher the vehicle speed is, the smaller will be the overlook angle.

In step S204, control determines the visual point E on the basis of the visual line end position (current vehicle position) F, the constant visual line length |EF|, the vertical overlook angle θ between the axis AA' and the visual point E dependent upon the vehicle speed, and the horizontal visual line direction angle φ between the x axis and the axis AA'.

In the example shown in FIG. 13, when the vehicle speed is high, the vertical overlook angle θ is set to θ3 and therefore the visual point is set to E3, so that the road map range to be displayed is A3–B3–C3–D3. On the other hand, when the vehicle speed is slow, the vertical overlook angle θ is set to θ4 and therefore the visual point is set to E4, so that the road map range to be displayed is A4–B4–C4–D4.

Figure 14:
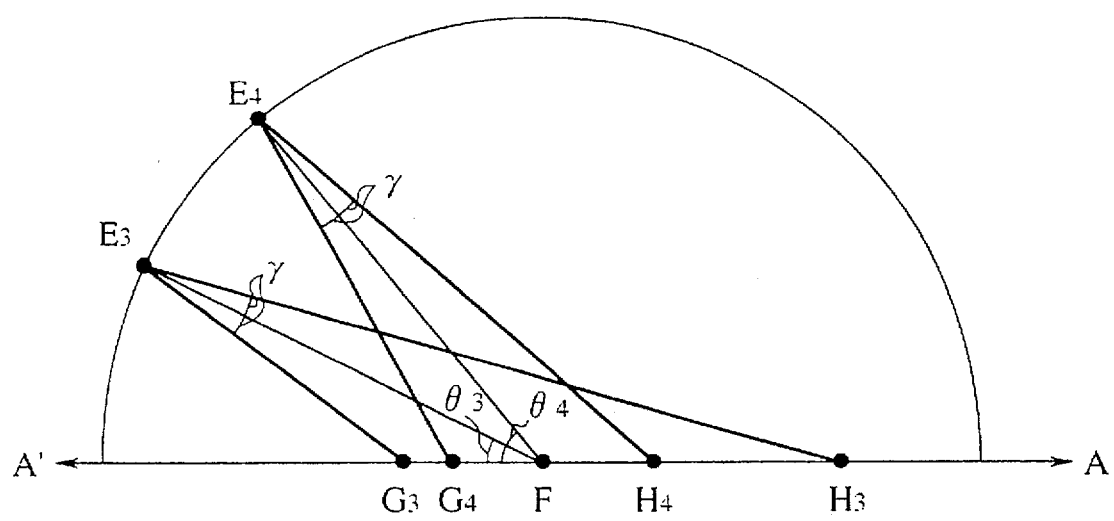
FIG. 14 is a view obtained when the view shown in FIG. 13 is seen from the side thereof.

FIG. 14 shows a view in which the direction AA' shown in FIG. 13 is taken along the abscissa, and the z-axis shown in FIG. 13 is taken along the ordinate. As shown, when the visual point is E3, the displayed map range is G3–H3; and when the visual point is E4, the displayed map range is G4–H4, respectively. Therefore, as shown in FIGS. 13 and 14, the higher the vehicle speed is, the smaller will be the vertical overlook angle θ so that a broader road map can be displayed.

As described above, in the second embodiment, the distance between the visual point E and the end F of the visual line length EF is always kept constant, and only the vertical overlook angle θ between the axis AA' and the visual line direction EF is changed according to the vehicle speed. Therefore, in practice, the higher the vehicle speed is, the smaller will be the vertical overlook angle θ or the lower the vehicle speed is, the larger will be the vertical overlook angle θ. Accordingly, when the vehicle speed is high, the broader road map can be displayed; and when the vehicle speed is low, the narrower road map near the current vehicle position can be displayed in detail. Further, in this second embodiment, since the distance between the visual point E and the visual lie end position F (the current vehicle position CVP) is kept always constant, even if the displayed road map is switched according to the vehicle speed, it is possible to obtain the road maps in roughly the same contraction scale ratio at the current vehicle position, so that the displayed road map is easy to see.

In the above-mentioned embodiments, although the navigation system provided with the function for calculating a recommendable route from a start point to a destination has been explained, the present invention can be applied to the navigation system having no such calculating function as described above.

Further, it is also preferable to display the determined visual point E and visual line direction EF on the display unit 10 whenever the road maps are switched according to the vehicle speed.

[Second Aspect]

The second aspect of the vehicle navigation system according to the present invention will be described hereinbelow. The feature of the second aspect is to change the horizontal visual line direction φ according to the distance d between the current vehicle position CVP and a specific traffic point (e.g., the nearest intersection along the recommendable travel route).

(First Embodiment of Second Aspect)

Figure 15:
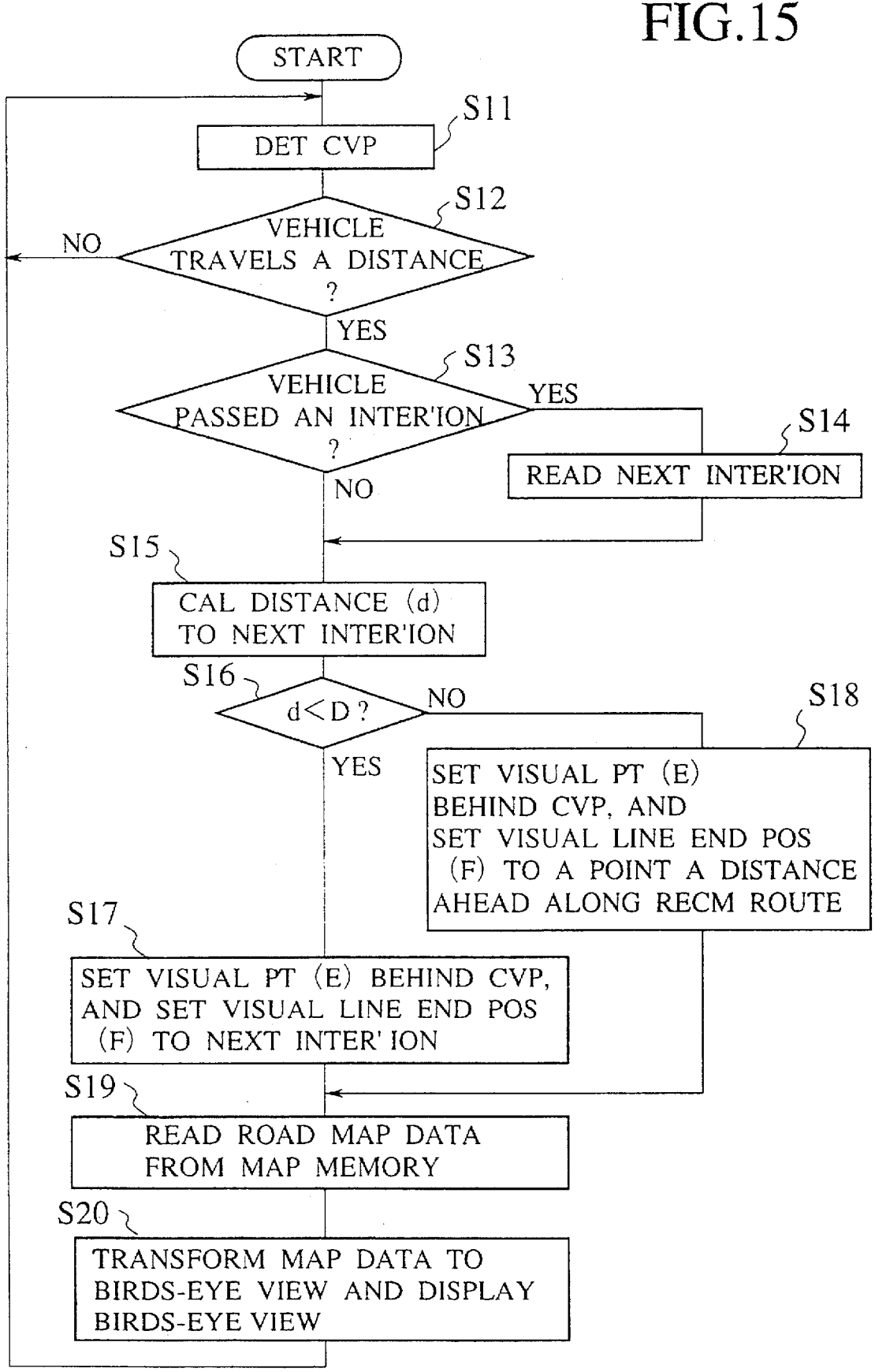
FIG. 15 is a flowchart showing a procedure of a first embodiment of a second aspect of the vehicle navigation system according to the present invention.

The first embodiment of the second aspect according to the present invention will be described. After the vehicle starts and further the recommendable travel route has been calculated in step S2 in FIG. 6, the CPU 4 executes the birds-eye view forming processing as shown in FIG. 15.

In step S11, control detects the current vehicle position CVP in the same way as in step S2 shown in FIG. 6.

In step S12, control discriminates whether the vehicle travels by a predetermined distance or not on the basis of the sensor pulse outputted by the vehicle speed sensor 2 or the GPS signal. If NO in step S12, control returns to the step S11. If YES, controls proceeds to step S13.

In step S13, control discriminates whether the vehicle passes through the guide intersection or not. If YES, control proceeds to step S14.

In step S14, control reads road map data to the nearest guide intersection in the travel direction from the RAM 6. If NO, control proceeds to the step S15.

In step S15, control calculates a distance d between the current vehicle position CVP and the nearest guide intersection.

In step S16, control discriminates whether the distance d to the nearest guide intersection is less than a predetermined distance D or not. If YES, control proceeds to step S17.

In step S17, the horizontal visual line direction φ is decided. That is, control decides the visual point E in the sky opposite to the current vehicle position along the vehicle travel direction (behind the vehicle current position), and further decides the visual line end position F to the nearest guide intersection in such a way that the nearest guide intersection can be seen downward from the decided visual point E in the visual line direction EF. In other words, the visual line direction angle φ or axis AA' from the x axis (See FIG. 9) is also set to the nearest intersection (not the current vehicle position CVP).

On the other hand, if NO in step S16, control proceeds to step S18, and decides the visual point in the sky opposite to the current vehicle position along the vehicle travel direction (behind the current vehicle position), and further decides the visual line end position F to a point a distance ahead along the recommendable route in such a way that a point by a predetermined distance ahead from the current vehicle position can be seen downward from the decided visual point E in the visual line direction EF.

Upon completion of the step S17 or S18, control proceeds to step S19, and reads the road map data within a predetermined road map range from the road map memory 3. That is, the road map data necessary within the range (ABCD in FIG. 2) corresponding to the decided visual point E and the decided visual line direction EF both decided in step 17 or 18 from the road map memory 3.

In step S20, control converts the road map data read in step S19 into data necessary for an birds-eye view road map and displays the converted road map data on the display unit 8. An example of the birds-eye view obtained by the processing in step S17 is shown in FIG. 16A, and an example of the birds-eye view obtained by the processing in step S18 is shown in FIG. 16B, respectively. In more detail, when the vehicle (an arrow) approaches the nearest guide intersection, the guide intersection is displayed substantially vertically at roughly the center of the display as shown in FIG. 16A. On the other hand, when the vehicle travels a long distance ahead from the nearest guide intersection, a point P a predetermined distance ahead from the current vehicle position (an arrow) along the recommendable route is displayed at roughly the central portion of the display as shown in FIG. 16B. Here, the point P is not actually shown on the display unit 8. Further, the vehicle current position is shown at roughly the same middle lower side portion of the display, irrespective of the distance d to the guide intersection. Further, the displayed map range shown in the display unit 8 is roughly the same, irrespective of the distance to the guide intersection.

As described above, in the first embodiment of the second aspect, when the distance d from the current vehicle position to the next guide intersection in the vehicle travel direction is short, since the forward direction (in which the current position and the next guide intersection are connected to each other) is displayed substantially vertically at roughly the central portion on the display unit 8, the driver can well see and know the next guide intersection more securely. On the other hand, when the distance from the current vehicle position to the next guide intersection is long, since the forward direction (in which the current position and a frontward position a predetermined distance ahead from the current position along the recommendable route) is displayed substantially vertically at roughly the central portion on the display unit 8, the driver can well see and know the mutual positional relationship between the current position and the frontward position along the recommendable route. Further, when the above-mentioned predetermined distance ahead from the current vehicle position is decided relatively long, it is possible to display the recommendable route over a long distance on the display unit 8.

Further, since the current vehicle position and the road map range are both always displayed in the same way, irrespective of the distance to the next guide intersection, whenever the birds-eye view road map is replaced with a new one, the driver can securely see the current vehicle position without losing the sight of the current vehicle position on the display unit 8.

(Second Embodiment of Second Aspect)

The second embodiment of the second aspect according to the present invention will be described. In the first embodiment, when the distance d between the current vehicle position and the next guide intersection is less than a predetermined value D, the horizontal visual line direction φ is set to the next guide intersection to display the next guide intersection vertically on the road map. In this second embodiment, when the distance d between is less than a predetermined value D, the horizontal visual line direction φ is set to the vehicle travel direction to display the vehicle travel direction vertically on the road map.

Figure 17:
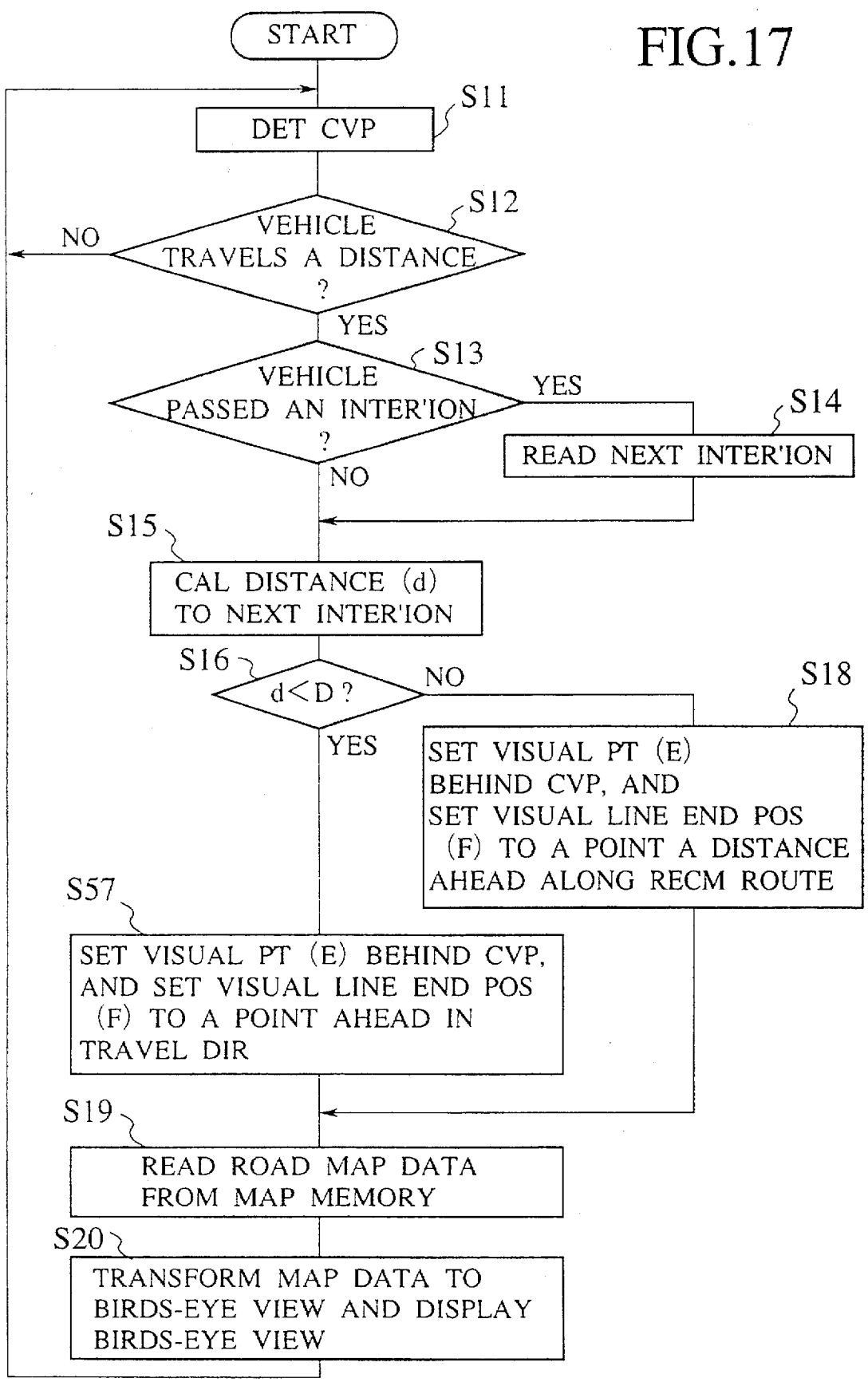
FIG. 17 is a flowchart showing a procedure of a second embodiment of the second aspect of the vehicle navigation system according to the present invention.

The second embodiment is basically the same as with the case of the first embodiment, except the birds-eye view forming processing executed in step S57 in FIG. 17.

In step S57, the vertical visual line angle φ is decided. That is, control decides the visual point E in the sky opposite to the current vehicle position along the vehicle travel direction (behind the vehicle current position), and further decides the visual line end position F to a point a predetermined distance ahead in the travel direction in such a way that the current vehicle travel direction can be seen downward from the decided visual point E in the visual line direction EF. In other words, the visual line direction angle φ or axis AA' from the x axis (See FIG. 9) is set to the vehicle travel direction (not the nearest intersection). Accordingly, the road map ahead of the current vehicle position along the vehicle travel direction can be displayed vertically on the display unit 8.

As described above, in the second embodiment, when the distance from the current vehicle position to the nearest guide intersection along the vehicle travel direction is short, since the vehicle travel direction can be displayed vertically on the display unit 8, the driver can well see and know the next guide intersection more securely, thus preventing the vehicle from being deviated from the recommendable route.

(Third Embodiment of Second Aspect)

The third embodiment of the second aspect according to the present invention will be described. In this third embodiment, the vertical overlook limit angle α is determined according to the distance d between the current vehicle position and the next guide intersection, and the vertical overlook angle θ is determined within the vertical overlook limit angle α in such a way that the recommendable route can be displayed over the longest distance.

Figure 18:
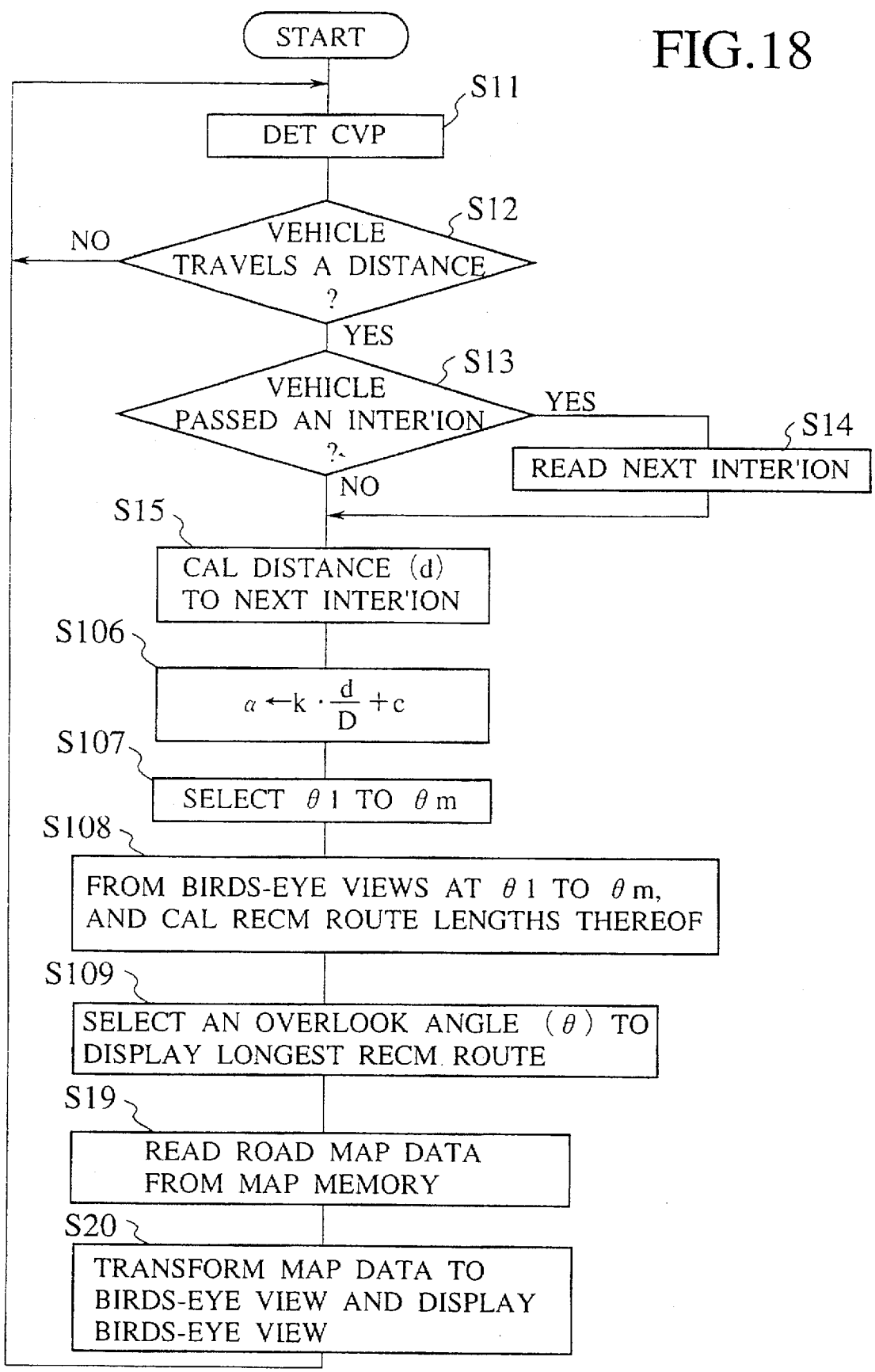
FIG. 18 is a flowchart showing a procedure of a third embodiment of the second aspect of the vehicle navigation system according to the present invention.

The third embodiment is basically the same as with the case of the first embodiment, except the birds-eye view forming processing executed in steps S106 to S109 in FIG. 18.

In step S106, control calculates the vertical overlook limit angle α in accordance with the formula (1):

$$\alpha = k \times d/D + c \qquad (4)$$

where k, D and c denotes a positive constant, respectively.

Here, the vertical overlook limit angle α implies an maximum angle θmax obtained when the vertical overlook angle θ can be changed from the vehicle travel direction. Further, in this third embodiment, an appropriate vertical overlook angle θ can be decided within the vertical overlook limit angle α in accordance with the following processing:

As understood in the formula (1), the vertical overlook limit angle α increases with increasing distance d to the guide intersection. In other words, since the vertical overlook limit angle α increases with increasing distance d between the current vehicle position and the next guide intersection, the selective range of the vertical overlook angle is increased.

In step S107, control selects several vertical overlook angles θ1 to θm (0<θ1<θ2 ... <θm) within the vertical overlook limit angle α.

In step S108, control forms birds-eye view road maps at the selected vertical overlook angles θ1 to θm, and calculates the recommendable route distances in the respective calculated birds-eye view road maps.

In step S109, control selects a vertical overlook angle θ at which the longest recommendable route distance can be displayed, and decides this vertical overlook angle θ as the visual line direction EF, to display the recommendable route over the longest distance.

In steps S19 and 20, control executes the same processing as shown in FIG. 15 to display the formed birds-eye view on the display unit 8.

As described above, in the third embodiment, the selection limit range α of the vertical overlook angle θ is changed according to the distance d between the current vehicle position and the nest guide intersection. When the distance to next guide intersection is short, since the selection range α of the visual direction can be narrowed, it is possible to display the guide intersection more securely on the display unit 8. On the other hand, when the distance to next guide intersection is long, since the selection range α of the visual direction can be widened, it is possible to select the visual direction in such a way that the recommendable route can be display over the long distance on the display unit 8.

(Fourth Embodiment of Second Aspect)

The fourth embodiment of the second aspect according to the present invention will be described. In this fourth embodiment, the visual point E (the horizontal distance between the visual point (x) and the current vehicle position is changed according to the distance d between the current vehicle position and the next intersection. Therefore, the map range or the map contraction scale ratio in the vicinity of the current vehicle position can be changed freely according to the distance to the next guide intersection.

This fourth embodiment of the second aspect is basically the same as the first embodiment of the first aspect described with reference to FIGS. 8 to 11, except that the visual point E is changed according to the distance d to the next intersection (not according to the vehicle speed).

Figure 19:
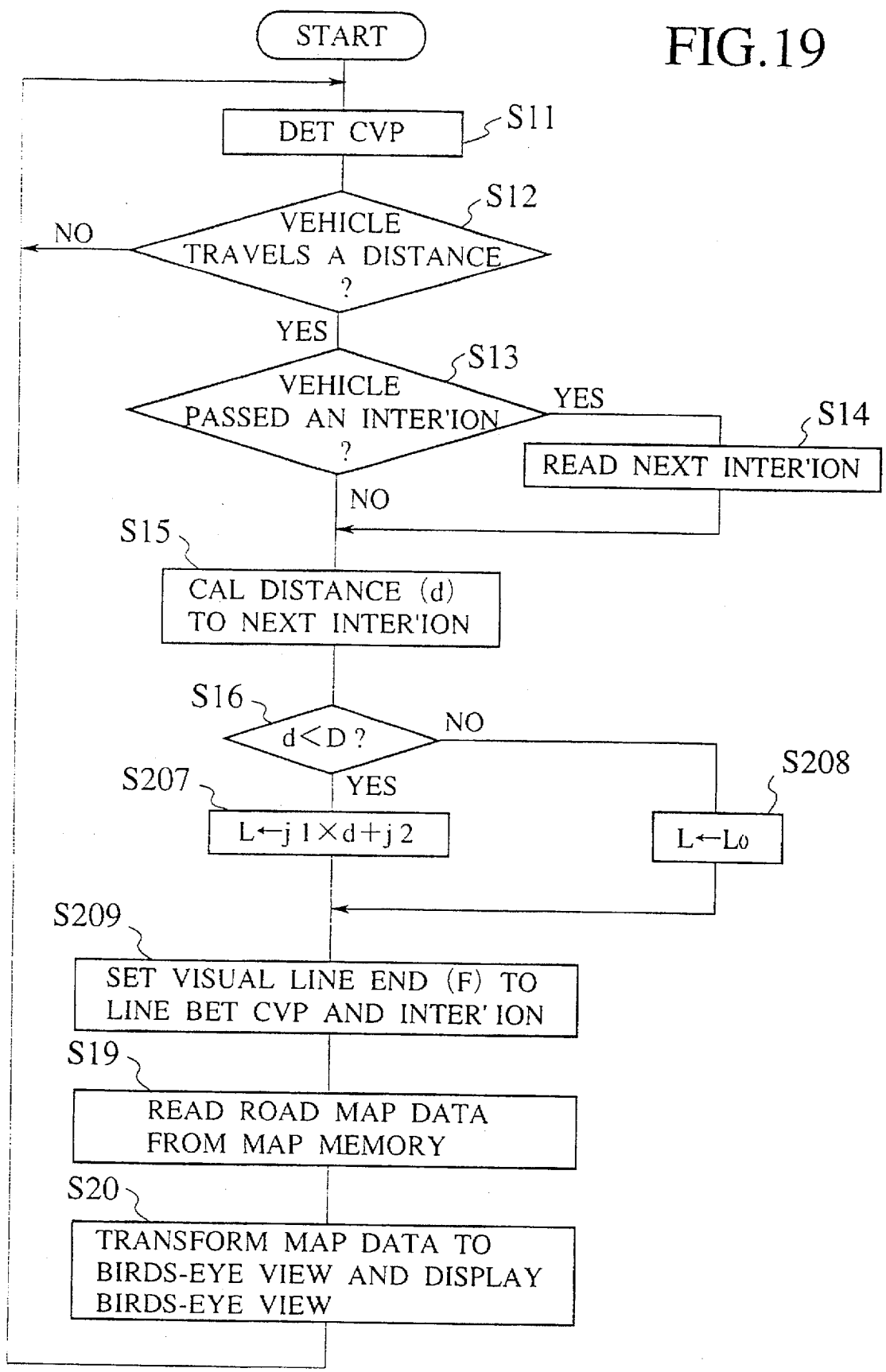
FIG. 19 is a flowchart showing a procedure of a fourth embodiment of the second aspect of the vehicle navigation system according to the present invention.

In this embodiment, only the birds-eye view forming processing is different from that of the first embodiment except the steps S207 to S209 shown in FIG. 19.

If YES in step S16, control proceeds to the step S207, and control calculates a distance L between the visual point E and the current vehicle position CVP in accordance with a formula (5) as follows:

$$L = j1 \times d + j2 \qquad (5)$$

where j1 and j2 are a constant, respectively.

On the other hand, if NO in step S16, control proceeds to step S208, and sets the distance L between the visual point E and the current vehicle position CVP to L0.

Upon the end of step S207 or S208, control proceeds to step S209, and sets the visual line end position F on a line obtained when the current vehicle position is connected to the next guide intersection. Owing to the step S209, when the distance L between the two is short, since the visual point E is decided as shown by E1 in FIG. 9, the displayed load map range A1–B1–C1–D1 is small as shown. On the other hand, when the distance L between the two is long, since the visual point E is decided as shown by E2 in FIG. 9, the displayed load map range A2–B2–C2–D2 is larger than that obtained from the visual point E1.

In steps S19 and S20, the road map of birds-eye view is formed in the same way as with the case of the other embodiments.

As described above, in this fourth embodiment, since the visual point E is changed according to the distance to the next guide intersection without changing the vertical overlook angle (θ), it is possible to freely change the road map range displayed on the display unit 8 or the contraction scale ratio of the birds-eye view road map.

(Fifth Embodiment of Second Aspect)

The fifth embodiment of the second aspect according to the present invention will be described. In this fifth embodiment, the visual point height is changed according to the distance d between the current vehicle position and the next intersection, without changing the visual line length EF. Therefore, the map range or the map contraction scale ratio in the vicinity of the current vehicle position can be changed freely according to the distance to the next guide intersection.

This fifth embodiment of the second aspect is basically the same as the second embodiment of the first aspect described with reference to FIGS. 12 to 14, except that the visual point E is changed according to the distance d to the next intersection (not according to the vehicle speed).

Figure 20:
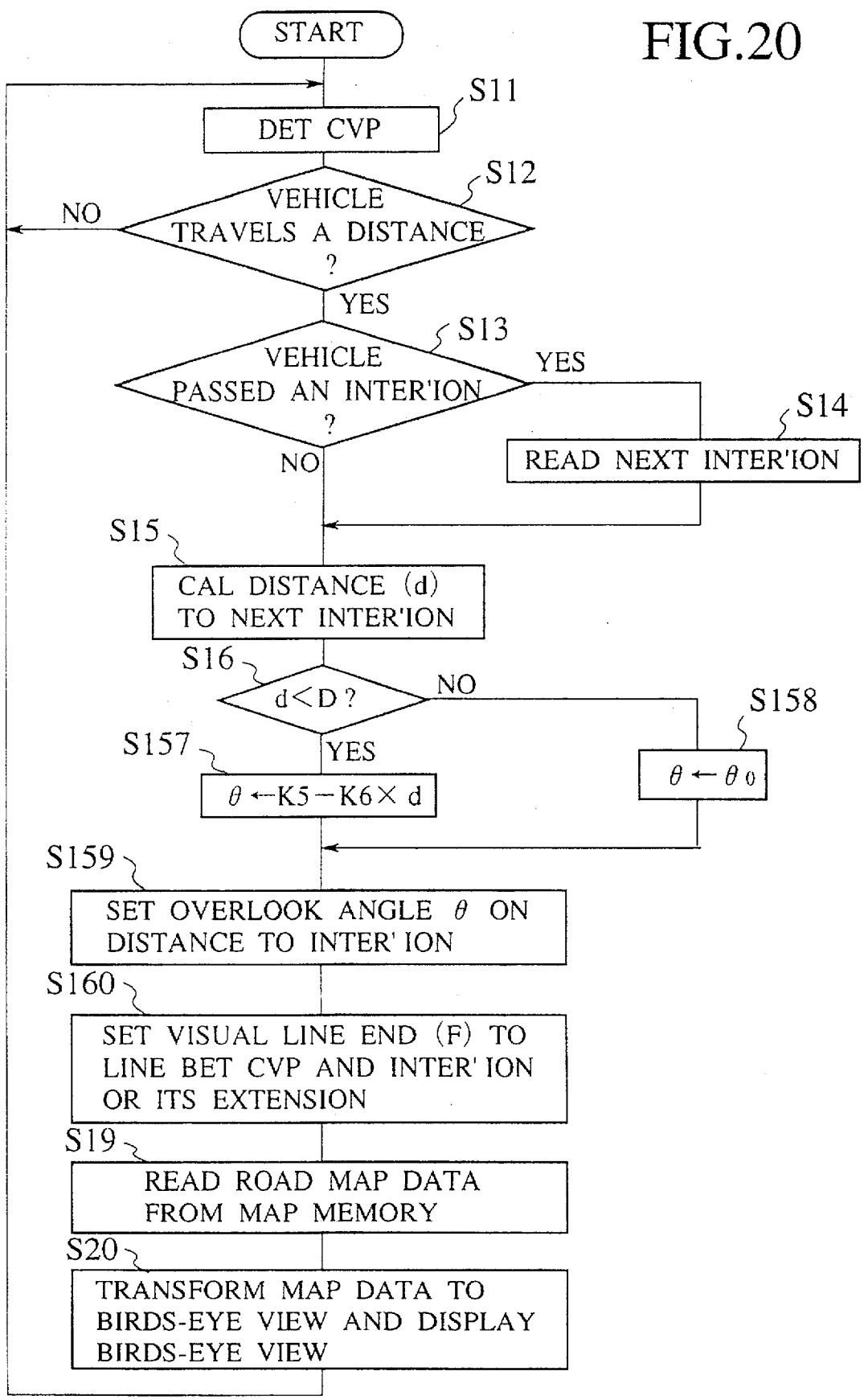
FIG. 20 is a flowchart showing a procedure of a fifth embodiment of the second aspect of the vehicle navigation system according to the present invention.

In this embodiment, only the birds-eye view forming processing is different from that of the first embodiment except the steps S157 to S160 shown in FIG. 20.

If YES in step S16, control proceeds to the step S157, and control calculates the vertical overlook angle θ in accordance with a formula (6) as follows:

$$\theta = k5 - k6 \times d \quad (6)$$

where k5 and k6 are a constant, respectively.

On the other hand, if NO in step S16, control proceeds to step S158, and sets the vertical overlook angle α to θ0.

Upon the end of step S157 or S158, control proceeds to step S159, and sets the vertical overlook angle α according to the distance to the next intersection. In other words, the height of the visual point E can be changed according to the distance d to the next intersection. After that, control proceeds to step S160, and sets the visual line end position F on a line obtained when the current vehicle position is connected to the next guide intersection or an extension thereof. Owing to the step S159, when the distance d to the next intersection is small, since the vertical overlook angle θ4 is large, the visual point E4 is high as shown in FIG. 13, so that the displayed load map range A4–B4–C4–D4 is small as shown. On the other hand, when the distance d to the next intersection is large, since the vertical overlook angle θ4 is small, the visual point E3 is low as shown in FIG. 13, so that the displayed load map range A3–B3–C3–D3 is large as shown.

In steps S19 and S20, the road map of birds-eye view is formed in the same way as with the case of the other embodiments.

As described above, in this fifth embodiment, since the visual point height or the vertical overlook angle θ is changed according to the distance to the next guide intersection, it is possible to freely change the road map range displayed on the display unit 8 or the contraction scale ratio of the birds-eye view road map.

In this fifth embodiment, the height of the visual point is changed according to the distance between the current vehicle position and the next guide intersection, so that the road map in the vicinity of the current vehicle position can be displayed at almost the same contraction scale ratio, irrespective of the distance to the next guide intersection.

As described above, in the fifth embodiment, when the vehicle approaches the guide intersection, the guide intersection and the vicinity thereof can be displayed in an enlarge scale. On the other hand, when the distance to the next guide intersection is long, the road map can be displayed at a relatively wide range toward the destination.

In the above-mentioned embodiments, the visual point and the visual direction are both determined on the basis of the distance between the current vehicle position and the nearest guide intersection. Without being limited only thereto, it is possible to change the visual point and the visual direction on the basis of the distance between the current vehicle position and another guide intersection.

Further, in the above-mentioned embodiments, the guide intersections are determined on the basis of the intersection angles between two or more roads, and the visual point and visual line direction are determined on the basis of the next guide intersection. Without being limited only thereto, it is possible to control the visual point and the visual line direction on the basis of a point (e.g., ground mark) other than the intersections or another intersection other than the next intersection. That is, any distinguishable key points or second or after intersections ahead of the current vehicle position can be selected as the guide intersection.

Further, it is also preferable to provide a select switch for selecting desirable one of the various embodiments in order to control the visual point and the visual line direction, when the distance to the next guide intersection is short.

As described above, in the vehicle navigation system according to the present invention, since the birds-eye view road maps of various visual points and various contraction scale ratios can be displayed appropriately according to the vehicle speed or the distance between the current vehicle position and a specific traffic point (e.g., the nearest intersection), the driver can see the road map under the best conditions at all times.

What is claimed is:

1. A vehicle navigation system, comprising:

vehicle position setting means for setting a start point and a destination of a vehicle;

vehicle speed sensing means for detecting vehicle travel speed;

vehicle travel azimuth detecting means for detecting vehicle travel direction;

road map data storing means for storing road map data related to various roads;

vehicle position detecting means for detecting a current vehicle position on the basis of the detected vehicle speed and travel direction after the start point and in accordance with road map data;

recommendable route calculating means for calculating a recommendable route from the start point to the destination on the basis of the road map data;

specific point extracting means for extracting specific traffic points for the vehicle to be guided from the calculated recommendable route;

distance comparing means for comparing a distance between the current vehicle position and one of the extracted specific traffic points with a predetermined value;

birds-eye view forming means for forming an birds-eye view road map taken from a visual point located in the sky behind the current vehicle position; the visual point being determined on the basis of a visual line end position, a visual line length, a vertical overlook angle, and a horizontal visual line direction angle according to a distance between the current vehicle position and one of the extracted specific traffic points; and display means for displaying the formed birds-eye view road map.

2. The navigation system of claim 1, wherein one of the extracted specific traffic points is a nearest guide intersection crossing the recommendable route.

3. The navigation system of claim 2, wherein said birds-eye view forming means sets the visual line end position to the nearest guide intersection, to display the nearest guide intersection substantially vertically on the display means, when the compared distance to the nearest guide intersection is shorter than the predetermined value; but to a point a predetermined distance ahead from the current vehicle position along the recommendable route, to display the recommendable route substantially vertically on the display means, when the compared distance to the nearest guide intersection is longer than the predetermined value.

4. The navigation system of claim 2, wherein said birds-eye view forming means sets the visual line end position to a point in the vehicle travel direction, to display the vehicle travel direction substantially vertically on the display means, when the compared distance to the nearest guide intersection is shorter than the predetermined value; but to a point a predetermined distance ahead from the current vehicle position along the recommendable route, to display the recommendable route substantially vertically on the display means, when the compared distance to the nearest guide intersection is longer than the predetermined value.

5. The navigation system of claim 2, wherein said birds-eye view forming means sets the vertical overlook angle at which the recommendable route can be displayed over the longest distance, by calculating several displayed recommendable routes within the vertical overlook limit angle determined according to the detected distance between the current vehicle position to the nearest guide intersection.

6. The vehicle navigation system of claim 2, wherein said birds-eye view forming means sets the visual point to a lower point near behind away from the current vehicle position when the compared distance to the nearest guide intersection is shorter than the predetermined value, but to a higher point far behind away from the current vehicle position when the compared distance to the nearest guide intersection is longer than the predetermined value, while keeping the vertical overlook angle at a constant value irrespective of the distance between the two; said birds-eye view forming means further setting the visual line end position to a line between the current vehicle position and the nearest guide intersection to display the nearest guide intersection substantially vertically on the display means, irrespective of the distance between the two.

7. The vehicle navigation system of claim 2, wherein said birds-eye view forming means sets the visual point to a higher point near behind away from the current vehicle position when the compared distance to the nearest guide intersection is shorter than the predetermined value, but to a lower point far behind away from the current vehicle position when the compared distance to the nearest guide intersection is longer than the predetermined value, while keeping a distance between the visual point and the current vehicle position at a constant value irrespective of the distance between the two; said birds-eye view forming means further setting the visual line end position to a line between the current vehicle position and the nearest guide intersection or an extension thereof to display the nearest guide intersection substantially vertically on the display means, irrespective of the distance between the two.

8. A method of guiding an automotive vehicle, comprising the steps of:

setting a start point and a destination of a vehicle;

detecting vehicle travel speed;

detecting vehicle travel direction;

storing road map data related to various roads;

detecting a current vehicle position on the basis of the detected vehicle speed and travel direction after the start point in accordance with road map data;

calculating a recommendable route from the start point to the destination on the basis of the road map data;

detecting whether the vehicle has passed through an intersection;

if has passed the intersection, reading a nearest intersection from the stored road map data;

if not passed through the intersection, calculating a distance d from the current vehicle position to the nearest intersection;

forming a birds-eye view road map taken from a visual point located in the sky behind the current vehicle position, by changing the visual point determined on the basis of a visual line end position, a visual line length, a vertical overlook angle, and a horizontal visual line direction angle, according to the calculated distance d to the nearest intersection;

calculating a road range to be displayed;

reading road map data from the stored road map data;

transforming the road map data into birds-eye view road map data;

storing the transformed birds-eye view road map data;

displaying the formed and stored birds-eye view road map; and updating the birds-eye view road map for each predetermined vehicle travel distance.

9. The method of guiding an automotive vehicle of claim 8, wherein the step of forming the birds-eye view road map comprises the steps of:

if the calculated distance d is shorter than the predetermined distance D, setting the visual point behind the current vehicle position and further setting the visual line end position to the nearest intersection; and if the calculated distance d is longer than the predetermined distance D, setting a visual point behind the current vehicle position and further setting the visual line end position to a point predetermined distance ahead from the current vehicle position along the recommendable route.

10. The method of guiding an automotive vehicle of claim 8, wherein the step of forming the birds-eye view road map comprises the steps of:

if the calculated distance d is shorter than the predetermined distance D, setting the visual point behind the current vehicle position and further setting the visual line end position to a point along a vehicle travel direction; and if the calculated distance d is longer than the predetermined distance D, setting the visual point behind the current vehicle position and further setting the visual line end position to a point a predetermined distance ahead from the current vehicle position along the recommendable route.

11. The method of guiding an automotive vehicle of claim 8, wherein the step of forming the birds-eye view road map comprises the steps of:

calculating a vertical overlook limit angle α in accordance with a formula as $$\alpha = k \times D/d + c$$

where k and D denote a constant, respectively;

selecting vertical overlook angles within the calculated vertical overlook limit angle;

forming birds-eye view road maps at the selected vertical overlook angles;

selecting one of the vertical overlook angles at which the recommendable route can be displayed over the longest distance;

forming an birds-eye view road map by changing the visual point on the basis of the selected vertical overlook angle.

12. The method of guiding an automotive vehicle of claim 8, wherein the step of forming the birds-eye view road map comprises the steps of:

if the calculated distance d is shorter than the predetermined distance D, calculating a distance L between the visual point and the current vehicle position in accordance with a formula as $$L = j1 \times d + j2$$

where j1 and j2 denote a constant, respectively;

if the calculated distance d is longer than the predetermined distance D, setting the distance L to a fixed value L0;

setting the visual line end position to a line between the current vehicle position and the nearest intersection; and forming an birds-eye view road map taken from a visual point, by changing the visual point on the basis of the calculated distance L between the visual point and the current vehicle position, and the set visual line end position, while keeping the vertical overlook angle at a constant value.

13. The method of guiding an automotive vehicle of claim 8, wherein the step of forming the birds-eye view road map comprises the steps of:

if the calculated distance d is shorter than the predetermined distance D, calculating the vertical overlook angle θ in accordance with a formula as $$\theta = k5 - k6 \times d$$

where k5 and k6 denote a constant, respectively;

if the calculated distance d is longer than the predetermined distance D, setting the vertical overlook angle θ to a fixed value θ0;

setting the visual line end position to a line between the current vehicle position and the nearest intersection or an extension line thereof; and forming an birds-eye view road map taken from a visual point, by changing the visual point on the basis of the calculated vertical overlook angle and the set visual line end position, while keeping the visual line length at a constant value.

* * * * *